US007121943B2

(12) United States Patent
Webb et al.

(10) Patent No.: US 7,121,943 B2
(45) Date of Patent: Oct. 17, 2006

(54) GAMING DEVICE WITH AN INCREASING GOAL ADVANCEMENT GAME

(75) Inventors: Bayard S. Webb, Sparks, NV (US); Tonja M. Peterson, Reno, NV (US); Anthony J. Baerlocher, Reno, NV (US); Paulina Rodgers, Reno, NV (US)

(73) Assignee: IGT, Reno, NV (US)

( * ) Notice: Subject to any disclaimer, the term of this patent is extended or adjusted under 35 U.S.C. 154(b) by 580 days.

(21) Appl. No.: 10/233,979

(22) Filed: Sep. 3, 2002

(65) Prior Publication Data

US 2003/0060277 A1 Mar. 27, 2003

Related U.S. Application Data

(63) Continuation-in-part of application No. 09/964,022, filed on Sep. 26, 2001, now Pat. No. 6,796,900.

(51) Int. Cl.
*A63F 13/00* (2006.01)

(52) U.S. Cl. ........................................................ 463/25

(58) Field of Classification Search .................. 463/16, 463/20–22, 25, 42; 273/143 R
See application file for complete search history.

(56) References Cited

U.S. PATENT DOCUMENTS

| | | | |
|---|---|---|---|
| 4,695,053 | A | 9/1987 | Vazquez, Jr. et al. |
| 5,205,555 | A | 4/1993 | Hamano |
| 5,324,041 | A | 6/1994 | Boylan et al. |
| 5,342,047 | A | 8/1994 | Heidel et al. |
| 5,536,016 | A | 7/1996 | Thompson |
| 5,769,716 | A | 6/1998 | Saffari et al. |
| 5,788,573 | A | 8/1998 | Baerlocher et al. |
| 5,833,536 | A | 11/1998 | Davids et al. |
| 5,833,537 | A | 11/1998 | Barrie |
| 5,851,148 | A | 12/1998 | Brune et al. |
| 5,873,781 | A | 2/1999 | Keane |
| 5,947,820 | A | 9/1999 | Morro et al. |
| 5,964,463 | A | 10/1999 | Moore, Jr. |
| 5,980,384 | A | 11/1999 | Barrie |
| 5,984,781 | A | 11/1999 | Sunaga |
| 5,997,400 | A | 12/1999 | Seelig et al. |
| 6,004,207 | A | 12/1999 | Wilson, Jr. et al. |
| 6,015,346 | A | 1/2000 | Bennett |
| 6,033,307 | A | 3/2000 | Vancura |
| 6,059,289 | A | 5/2000 | Vancura |
| 6,089,976 | A | 7/2000 | Schneider et al. |
| 6,102,798 | A | 8/2000 | Bennett |
| 6,120,031 | A | 9/2000 | Adams |
| 6,126,542 | A | 10/2000 | Fier |
| 6,126,547 | A | 10/2000 | Ishimoto |

(Continued)

FOREIGN PATENT DOCUMENTS

| | | | |
|---|---|---|---|
| EP | 0945837 | A2 | 9/1999 |

(Continued)

OTHER PUBLICATIONS

Top Dollar Brochure written by IGT, published in 1998.

(Continued)

*Primary Examiner*—Kim Nguyen
(74) *Attorney, Agent, or Firm*—Bell, Boyd & Lloyd LLC

(57) ABSTRACT

The present invention provides an apparatus and method for operating a gaming device that enables a player to obtain an award based upon the number of goals the player is able to achieve during game play. The goals advance in difficulty as the player achieves each goal. The game terminates automatically when the player fails to achieve a goal.

56 Claims, 27 Drawing Sheets

U.S. PATENT DOCUMENTS

| | | | | |
|---|---|---|---|---|
| 6,135,885 | A | 10/2000 | Lermusiaux | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A * | 12/2000 | Slomiany et al. | 463/25 |
| 6,162,121 | A | 12/2000 | Morro et al. | |
| 6,164,652 | A | 12/2000 | Lauretta et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,235 | B1 | 1/2001 | Walker et al. | |
| 6,190,255 | B1 | 2/2001 | Thomas et al. | |
| 6,203,429 | B1 | 3/2001 | Demar et al. | |
| 6,213,876 | B1 | 4/2001 | Moore, Jr. | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,261,177 | B1 | 7/2001 | Bennett | |
| 6,270,409 | B1 | 8/2001 | Shuster | |
| 6,299,165 | B1 | 10/2001 | Nagano | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,328,649 | B1 | 12/2001 | Randall et al. | |
| 6,346,043 | B1 | 2/2002 | Colin et al. | |
| 6,347,996 | B1 | 2/2002 | Gilmore et al. | |
| 6,364,768 | B1 | 4/2002 | Acres et al. | |
| 6,406,369 | B1 | 6/2002 | Baerlocher et al. | |
| 6,443,837 | B1 | 9/2002 | Jaffe et al. | |
| 6,491,584 | B1 | 12/2002 | Graham et al. | |
| 6,494,785 | B1 | 12/2002 | Gerrard et al. | |
| 6,547,242 | B1 | 4/2003 | Sugiyama et al. | |
| 6,648,754 | B1 | 11/2003 | Baerlocher et al. | |
| 6,796,900 | B1 * | 9/2004 | Baerlocher et al. | 463/16 |
| 6,808,452 | B1 | 10/2004 | Baerlocher et al. | |
| 6,960,132 | B1 | 11/2005 | Baerlocher et al. | |

FOREIGN PATENT DOCUMENTS

WO PCT/AU97/00121 9/1997

OTHER PUBLICATIONS

Slot Line Advertisement including Temperature Rising game description written by IGT, published in 1998.

Bonus Spin Red, White & Blue Advertisement written by IGT, published date unknown.

Bingo Brochure written by Casino Data Systems, published in 1998.

Full House Brochure written by Anchor Games, published in 2000.

Jewel in the Crown Advertisement written by IGT, published in 2000.

Red Hot 7's Game Description written by IGT, game availale prior to 2001.

Take Your Pick Article in Strictly Slots Advertisement written by Anchor Games, published Mar. 2001.

Harley-Davidson Advertisement written by IGT, published prior to 2001.

Showcase Showdown (Price is Right) Advertisement written by IGT, pu.blished prior to 2001.

Rules of Football Page!, published by The Oracle Education Foundation, available prior to May 24, 1999.

* cited by examiner

FIG.4A 126, 142, 140

| 0-15% | |
|---|---|
| -5 | 4 |
| 1 | 6 |
| 2 | 8 |
| 3 | 10 |

FIG.4B 128, 142, 140

| 16-30% | |
|---|---|
| 2 | -2 |
| 3 | 1 |
| 7 | 4 |
| 20 | 15 |

FIG.4C 130, 142, 140

| 31-45% | |
|---|---|
| 0 | 3 |
| 1 | 4 |
| 2 | 5 |
| 35 | 15 |

FIG.4D 132, 142, 140

| 46-60% | |
|---|---|
| -4 | -2 |
| 3 | 0 |
| 5 | 1 |
| 20 | 2 |

FIG.4E 134, 142, 140

| 61-80% | |
|---|---|
| -10 | -5 |
| 0 | 1 |
| 5 | 2 |
| 20 | 4 |

FIG.4F 136, 142, 140

| 81-100% | |
|---|---|
| -3 | -2 |
| -1 | 0 |
| 2 | 1 |
| 5 | 4 |

FIG.5A 146 142 140

| 0-15% | |
|---|---|
| -5 | 1 |
| 3 | 2 |
| 8 | 4 |
| 10 | 6 |

| ASSOCIATED CONSOLATION AWARD | ASSOCIATED CONSOLATION AWARD SUCCESS PERCENTAGE |
|---|---|
| 85 | 15% |

144 158

FIG.5B 148 142 140

| 16-30% | |
|---|---|
| 2 | -2 |
| 3 | 1 |
| 7 | 4 |
| 20 | 15 |

| ASSOCIATED CONSOLATION AWARD | ASSOCIATED CONSOLATION AWARD SUCCESS PERCENTAGE |
|---|---|
| 70 | 30% |

144 158

FIG.5C

150

| 31-45% | |
|---|---|
| 0 | 3 |
| 1 | 4 |
| 2 | 7 |
| 35 | 15 |

| ASSOCIATED CONSOLATION AWARD | ASSOCIATED CONSOLATION AWARD SUCCESS PERCENTAGE |
|---|---|
| 55 | 45% |

140, 142, 144, 158

FIG.5D

152

| 46-60% | |
|---|---|
| -4 | -2 |
| 3 | 0 |
| 5 | 1 |
| 20 | 2 |

| ASSOCIATED CONSOLATION AWARD | ASSOCIATED CONSOLATION AWARD SUCCESS PERCENTAGE |
|---|---|
| 40 | 60% |

140, 142, 144, 158

FIG.5E 154, 142, 140

| 61-80% | |
|---|---|
| -10 | -5 |
| 0 | 1 |
| 5 | 2 |
| 20 | 4 |

| ASSOCIATED CONSOLATION AWARD | ASSOCIATED CONSOLATION AWARD SUCCESS PERCENTAGE |
|---|---|
| 25 | 75% |

144, 158

FIG.5F 156, 142, 140

| 81-100% | |
|---|---|
| -3 | 0 |
| -1 | 1 |
| 2 | 2 |
| 5 | 4 |

| ASSOCIATED CONSOLATION AWARD | ASSOCIATED CONSOLATION AWARD SUCCESS PERCENTAGE |
|---|---|
| 15 | 85% |

144, 158

FIG.7

180

170

182

| | |
|---|---|
| STAGE 1 | 90% |
| STAGE 2 | 80% |
| STAGE 3 | 65% |
| STAGE 4 | 50% |
| STAGE 5 | 35% |
| STAGE 6 | 25% |
| STAGE 7 | 15% |
| STAGE 8 | 10% |

GAMING DEVICE WITH AN INCREASING GOAL ADVANCEMENT GAME

PRIORITY CLAIM

The present invention is a continuation-in-part and claims the benefit of U.S. patent application Ser. No. 09/964,022 filed on Sep. 26, 2001, and now issued as U.S. Pat. No. 6,796,900.

BACKGROUND OF THE INVENTION

The present invention relates in general to a gaming device, and more particularly to a gaming device with an increasing goal advancement game.

Known gaming machines randomly generate outcomes for a player and have varying levels of player interaction. Wagering gaming machines exist having no player interaction and only a random generation. PCT application number PCT/AU97/00121 entitled, "Slot Machine Game with Roaming Wild Card," discloses a slot machine having a video display containing a plurality of rotatable reels with game symbols. When the player receives a triggering symbol or symbol combination, the game produces a bonus symbol. The bonus symbol moves from game symbol to game symbol temporarily changing the game symbol to a bonus symbol. If the change results in a winning combination, the player receives an award.

Known gaming machines also have a random generation and a player selection. For instance, one known gaming machine provides a player one or more opportunities to select masked bonus awards from a group of masked awards displayed to the player. When the player selects a masked award, the player receives the value of the award, the game displays a message that the player may continue and enables the player to select another masked award. The player selects another masked award, and the sequence continues until the player selects a masked terminator. European Patent Application No. EP 0 945 837 A2 discloses such a game.

Known gaming machines have a plurality of random generations, a player selection and a player decision. For instance, one game allows players to accept or decline multiple award offers. The TOP DOLLAR® gaming device, which is manufactured and distributed by the assignee of this application, provides the player with three offers and a final award. When an offer is given, the player may accept or reject it by pushing an accept button or a reject button, respectively. If the player accepts an offer, the player receives the accepted bonus amount and the bonus round terminates. If the player declines an offer, the game generates another offer for the player. The final award is automatically provided to the player.

In each of these games, the random selections do not accumulate; rather, they are evaluated independently. That is, the roaming wildcard game has only one random generation, wherein the game randomly generates a plurality of symbols, which determine whether the roaming wildcard produces winning combinations. In the select until game, the player's picks are evaluated individually, whereby a single uncovered game terminator ends the game. In the offer acceptance game, the player evaluates the outcome of a single random generation to determine whether to keep the outcome or risk a swap.

SUMMARY OF THE INVENTION

The present invention includes a gaming device which displays a plurality of choices or selections to a player, whereby each choice generates or provides an associated number of points. In one embodiment, the points equal awards that the game provides to the player. The game provides an initial number of picks to the player. The game also maintains a regeneration amount, whereby the player receives a new number of picks if the points or awards associated with the player's choices or picks accumulate at least to the regeneration amount, within the initial number of picks.

The gaming device of the present invention also includes a plurality of point tables which include the points that the processor associates with the choices or picks. The processor of the gaming device accumulates the total points, which is the sum of all points associated with the player's choices or picks.

The processor also maintains a goal amount of points. The game provides an award to the player when the player achieves the goal or goal amount. This award is in addition to awards achieved when the player generates points (in the embodiment where the points equal awards).

The game preferably selects and uses a point table from a plurality of point tables, wherein the selected point table is associated with a percentage of the goal achieved. The percentage is the player's total points divided by the goal amount of points. That is, as the player accumulates points, the percentage of the goal amount increases. The processor then chooses a point table from the plurality of point tables based on the current percentage. The game maintains certain percent ranges, such as 0–15%, 16–30%, etc., whereby the game maintains a different point table for each range. The present invention further includes a plurality of point tables for each range, wherein the game randomly chooses one of the tables when the player accumulates enough points to enter a range.

The present invention includes a method for operating the gaming device. In this method, the game displays a plurality of choices and provides a number of picks to a player. The game prompts the player to pick a choice and, upon a pick, sends a corresponding input to the processor. The game provides an associated number of points to the player and adds the points to any previously accumulated points, to form a total number of points. The game adds the pick to any previously accumulated picks to form a total number of picks.

The game determines if the total number of points is equal or greater than a regeneration amount and if the total picks equals the number of provided picks. The game provides a new number or set of picks if the total number of points is equal to or greater than the regeneration amount. The game prompts the player to pick a new choice if the total number of picks is less than the number of provided picks and the total number of points is less than the regeneration amount. The game ends if the total number of picks equals the number of provided picks and the total number of points is less than the regeneration amount.

The present invention includes an alternative method associated with the operation of the gaming device. In this method, the game displays a plurality of choices on a display device. The processor maintains a plurality of point tables, wherein the point tables include points associated with the choices or picks. The processor accumulates a total number of points via the player's picks. The processor maintains a goal amount and assigns a point table to each choice or pick based on a percentage, wherein the percentage equals the total number of points divided by the goal amount. The processor prompts the player to make a choice and upon receiving an input, provides points from the assigned point table. The points preferably equal awards for the player.

In one alternative embodiment according to the present invention, the gaming device enables a player to play a game having an increasing goal advancement. Preferably, the game includes a plurality of award levels. Each of the award levels has an associated goal value. In one embodiment, the game provides increasing goal advancement, that is, the goal value increases as the award level is advanced or for each subsequent award level. However, It should be appreciated that in alternative embodiments, the goal value may decrease as the award level is advanced or for each subsequent award level.

The gaming device of this embodiment further includes at least one value generator having a plurality of predetermined symbols. The value generator can be any suitable value generator such as a mechanical wheel, a video wheel, a mechanical reel or a video reel. The symbols can include any suitable predetermined symbol such as alphanumeric symbols, multiplier symbols, picture symbols and combinations thereof. In one embodiment, the value generator includes two video wheels, each wheel having a plurality of predetermined numerical symbols. In one embodiment, the value generator includes three video reels, each reel having a plurality of predetermined numerical symbols and multiplier symbols.

The symbols on the value generator generate a score value. The score value is compared to the goal value. If the score value achieves the goal value, the award level is advanced. In one embodiment, the score value achieves the goal value when the score value is greater than or equal to the goal value. In alternative embodiments, the score value achieves the goal value when the score value is less than or equal to the goal value.

An award is provided to the player based on the award level obtained during the game. In one embodiment, the award is based on the goal value of the award level obtained during the game. In another embodiment, the award is based on the sum of the goal values of each of the award levels obtained during the game. In an alternative embodiment, the award may be based on the score value.

The present invention includes one preferred method for operating a gaming device. The method includes the steps of setting a goal, randomly generating a score, and advancing the goal when the score achieves the goal. According to the method, the generating step and the advancing step are repeated until the score fails to achieve the goal. Once the score fails to achieve the goal, an award is provided to a player based on at least one of the score and the goal.

In one embodiment, the goal is to beat a previous score obtained by the player. Thus, the goal advances if the player's score is greater than their previous score. In one embodiment, the first goal is set without reference to the player's score. In one embodiment, the first goal is zero. Alternatively, the first goal could be randomly selected or predetermined.

The value generator generates a score for the player. If the score generated by the value generator is greater than the first goal, the player achieves the first goal. After achieving the first goal, the player has two options from which to choose. The first option is to collect the score they obtained as an award. If the player decides to collect the score, the player is awarded their score as an award and the game ends. The second option is to try to beat their score and compete for a larger award. If the player decides to try to beat their score, the new goal is their current score and the value generator again generates a score for the player.

If the score generated by the value generator is not greater than the goal (i.e., the player's previous score), then the player has not achieved the goal and the game ends. The player does not collect any award. Alternatively, the game could award the player a consolation award. If the score generated by the value generator is greater than the player's previous score, then the player has achieved the goal. Again, the player is presented with two options from which to choose, that is, collecting the newly obtained score as an award, or trying again to beat their score. Game play continues in this fashion until the player collects the score as an award or until the player fails to achieve the goal.

It one embodiment, as the player achieves a goal, the probability of achieving the next goal decreases. Thus, the player can choose to try to achieve the next goal and a higher award, but the chances of achieving the goal and a higher award decrease with each successive goal that is achieved. Accordingly, when the player achieves the goal, they are given the option of collecting their score as an award because the probability of achieving the next goal will be lower than the goal they just achieved.

In one embodiment, the player is awarded an encore round or game. The encore round can be triggered by any suitable encore trigger. In one embodiment, the encore trigger is a predetermined number of goals achieved by the player. In one embodiment, the encore trigger is based on the player's score. In one embodiment, the encore trigger is a predetermined symbol that occurs on the value generator. In one embodiment, the encore trigger occurs randomly.

After being awarded the encore round, the player's current score is collected as an award and the player is able to repeat the game. The player must again beat the first goal to achieve the goal. If the player does not achieve the first goal, the game ends. If the player achieves the first goal, then the game continues as described above. Thus, the player has the benefit of collecting their score as an award and continuing to try to beat their scores and collect higher awards. It should also be appreciated that the player could again be provided an encore round. Thus, the player could collect their current award and repeat the game again. It should be appreciated that the game would continue in this manner until the player fails to achieve one of the goals.

It is therefore an advantage of the present invention to provide a gaming device having a number of picks and a regeneration amount, wherein the game regenerates the number of picks if the player accumulates the regeneration amount of points within the initially provided number of picks.

Another advantage of the present invention is that the gaming device maintains a goal amount and accumulates a player's points, whereby the accumulated points divided by the goal amount form a percentage, and whereby the game selects a point table based on the current percentage.

Another advantage of the present invention is that the gaming device enables a player to play a game having increasing goal advancement.

Additional features and advantages of the present invention are described in, and will be apparent from, the following Detailed Description of the Invention and the Figures.

BRIEF DESCRIPTION OF THE FIGURES

FIGS. 4A through 4F are schematic views of point or award pools of one embodiment of the present invention, which include points or awards that the game assigns to the game's choices or the player's picks.

FIGS. 5A through 5F are schematic views of the point or award pools of FIGS. 4A through 4F, which additionally include a consolation award and an associated likelihood of obtaining the consolation award.

FIG. 7 is a schematic view of an alternative stage table that illustrates a plurality of stages and success percentage associated with each stage, wherein the success percentage is the likelihood that the game generates an advance versus a no advance outcome.

DETAILED DESCRIPTION OF THE INVENTION

Gaming Device and Electronics

Figure 1A:
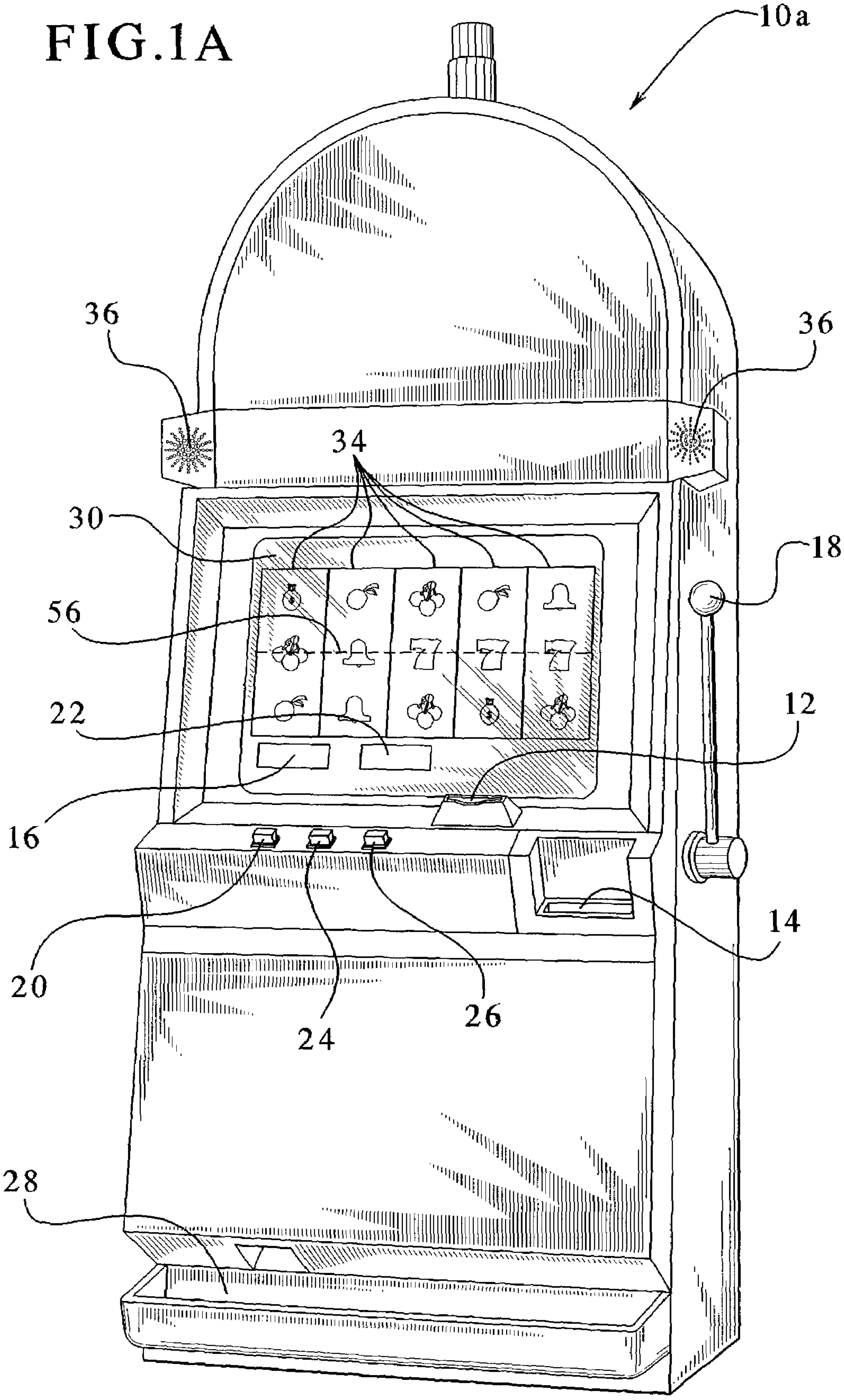
FIG. 1A is a front-side perspective view of one embodiment of the gaming device of the present invention.
Figure 1B:
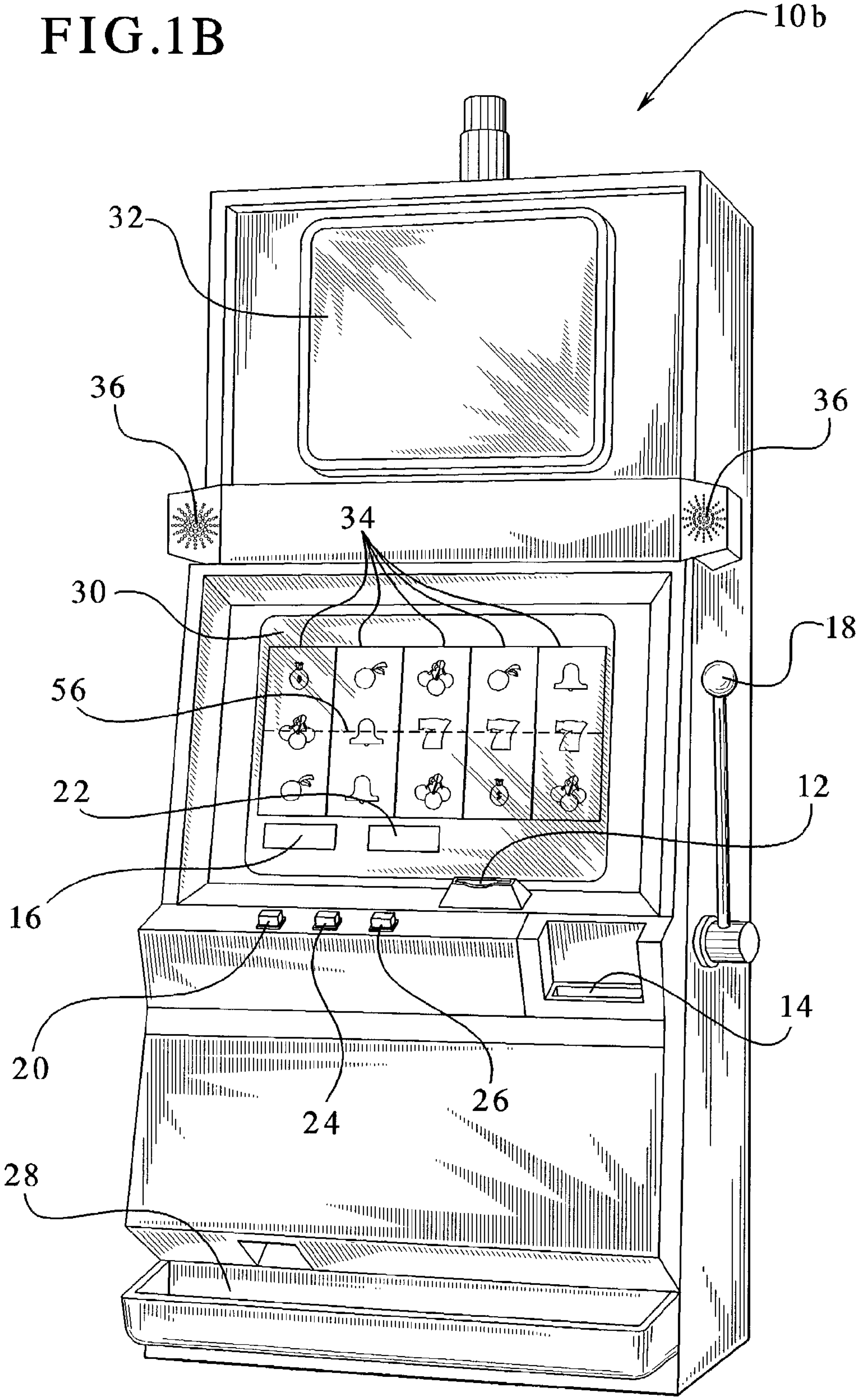
FIG. 1B is a front-side perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
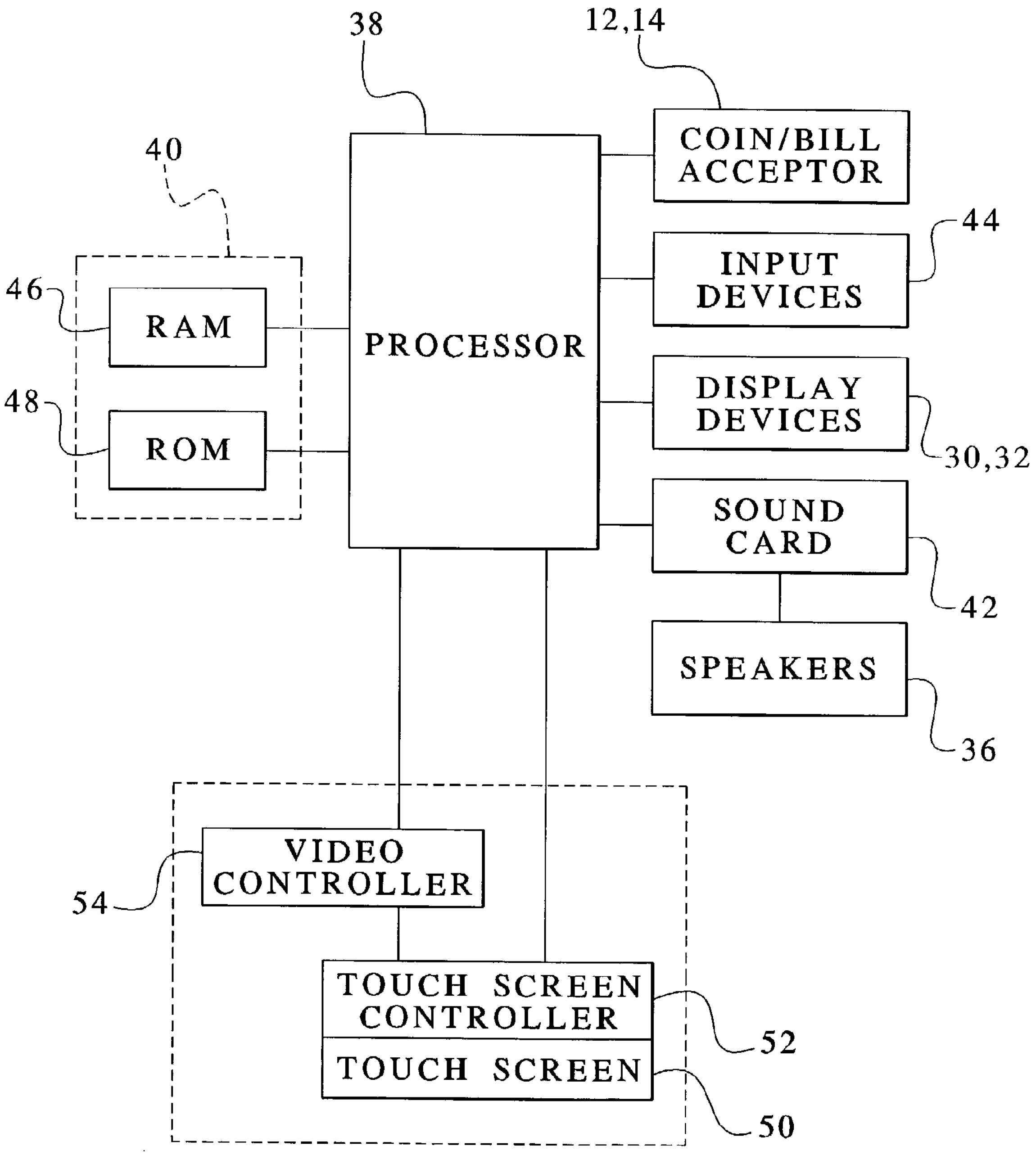
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32;

a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or the "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Choices and Databases

Figure 3:
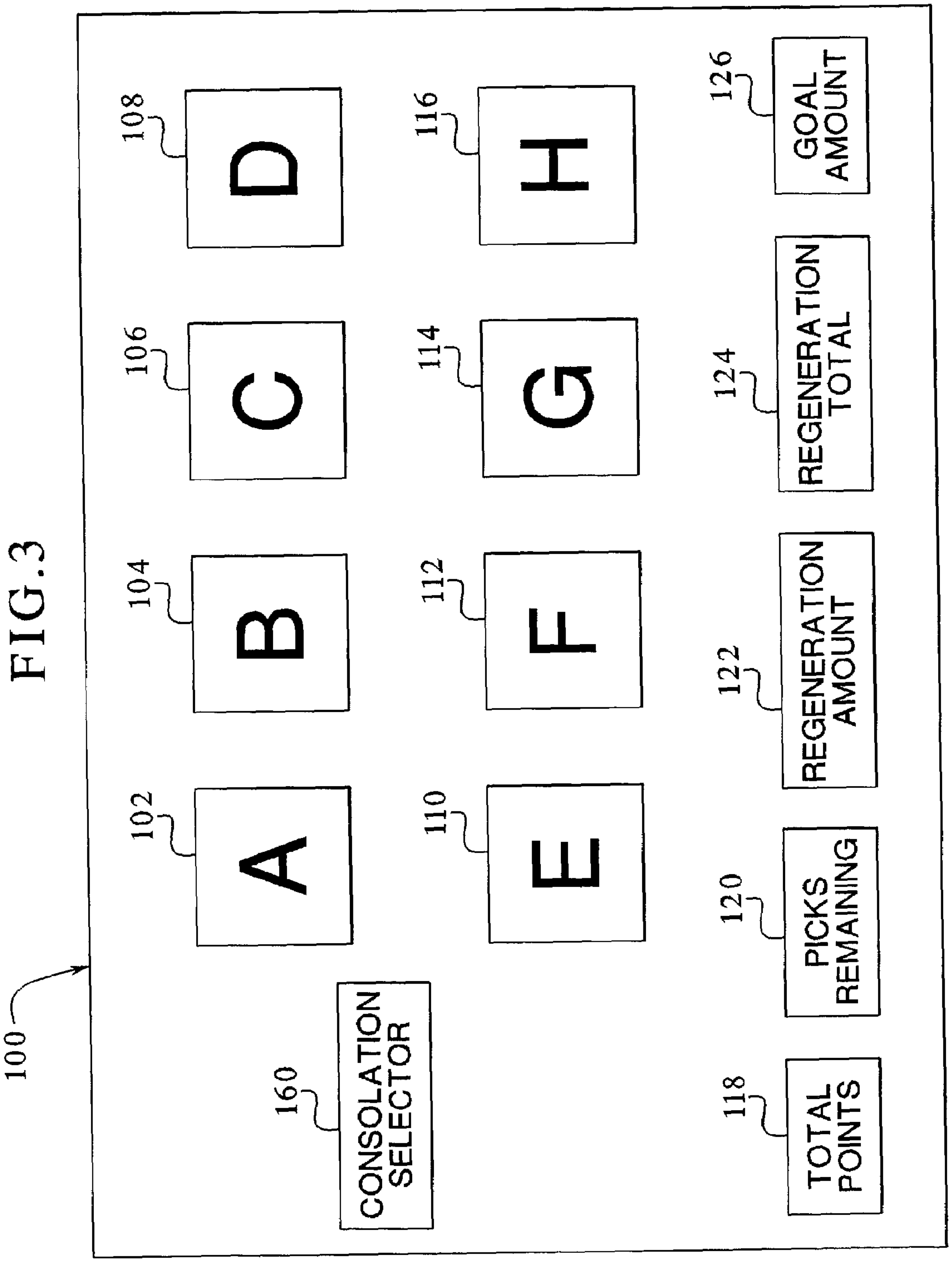
FIG. 3 is a front elevational view of one of the display devices of FIGS. 1A and 1B illustrating one embodiment of the present invention.
Figure 6A:
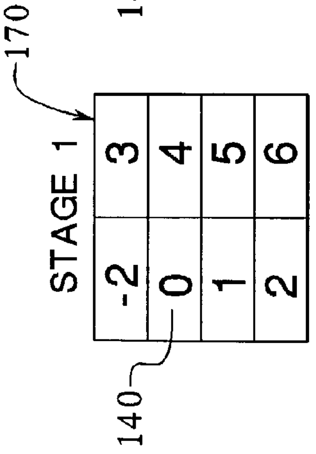
FIGS. 6A through 6H are schematic views of stage tables, which include points or awards that the game assigns to the game's choices or player's picks.
Figure 6B:
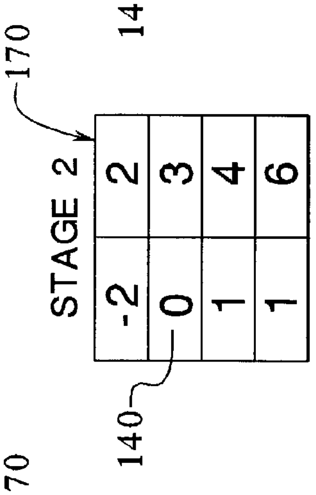
Figure 6C:
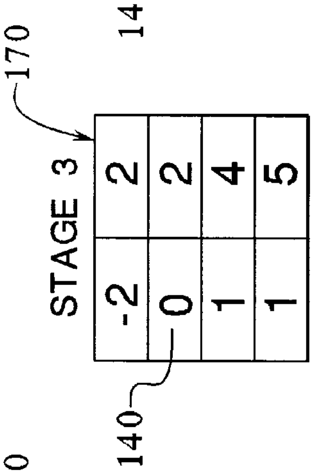
Figure 6D:
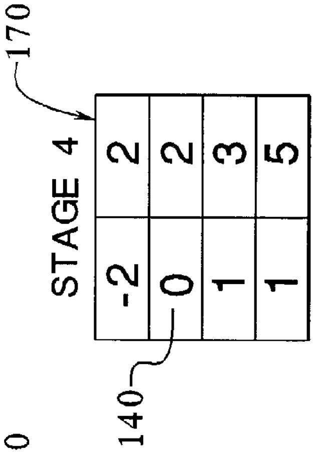
Figure 6E:
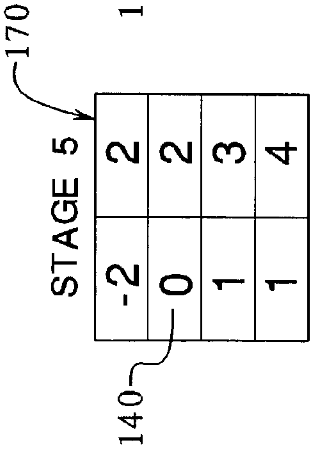
Figure 6F:
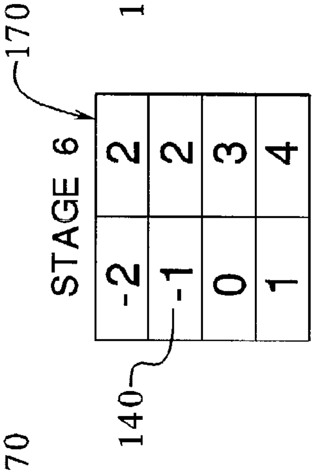
Figure 6G:
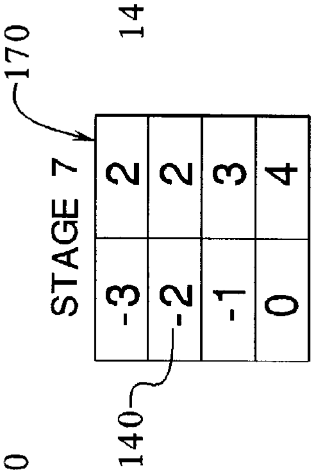
Figure 6H:
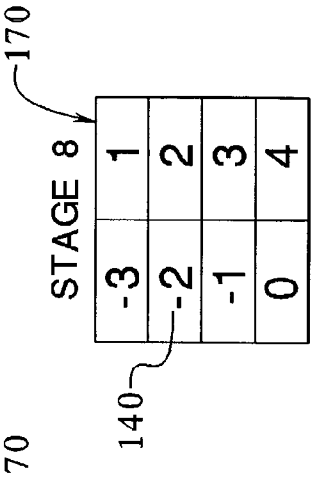

Referring now to FIG. 3, the display 100 of the gaming machine includes a plurality of player selectable choices 102, 104, 106, 108, 110, 112, 114 and 116. The display 100 includes eight choices, however, the present invention contemplates any suitable number of choices. The choices 102, 104, 106, 108, 110, 112, 114 and 116 are preferably areas of a touch screen 50 such that when the game enables an input to be made to the processor 38 of FIG. 2, a player may touch and pick any of the choices and thereby send a discrete input to the processor 38. The game does not always enable the inputs, so that when the input is not enabled and the player touches a choice, the game does not send an input. The game enables the input at the appropriate time of a sequence, as described below.

The choices 102, 104, 106, 108, 110, 112, 114 and 116 preferably include suitable indicia, here the letters "A" through "H," respectively, which designate one choice from another. The choices and their accompanying indicia may alternatively be electromechanical input devices mounted to the gaming device 10, similar to the play button 20, the bet one button 24 and the cash out button 26 illustrated in FIGS. 1A and 1B. The choices in electromechanical form display their identifying indicia in any suitable manner, such as a including a light source behind the devices.

The display 100 preferably includes a total points indicator 118, a picks remaining indicator 120, a regeneration amount indicator 122, a regeneration total indicator 124 and a goal amount indicator 126. The indicators 118, 120 and 124 are preferably areas of a video monitor display device 30 or 32 adapted such that when the processor 38 (FIG. 2) updates the player's points or receives an input from a pick, the indicators convert and display an updated signal from the processor.

More specifically, the total points indicator 118 receives updated point or award signals, translates the signals and displays the player's total updated points or awards as the player picks choices and accumulates their associated points or awards.

The picks remaining indicator 120 receives updated award signals, translates the signals and displays the player's remaining picks as the player picks choices. As discussed below, the game provides a number or set of picks to the player, such as four picks. As the player makes the picks, the processor preferably counts backward from the original number or forward from zero, and the picks remaining indicator 120 displays this count.

The regeneration amount indicator 122 and the goal amount indicator 126 are preferably static displays in a single game of the present invention. The present invention contemplates providing a new set of picks or resetting the number of picks if the player accumulates a predetermined amount of points or awards within the number or set of provided picks. The regeneration amount indicator 122 displays the number of points or awards necessary to generate a new set of picks or reset the number of picks.

The regeneration amount preferably does not change in a game of the present invention, although the present invention includes different regeneration amounts in different games. In one example, the regeneration amount is initially set to ten points or awards and stays the same throughout the game. Alternatively, the regeneration amount varies throughout the course of the game. In an example wherein the amount varies, the regeneration amount is initially set to ten points or awards and, at a later point in the game, changes to twenty points or awards. The regeneration amount indicator 122 displays the current regeneration amount and accordingly updates and displays any change.

The regeneration total indicator 124 receives updated award signals, translates the signals and displays the player's regeneration points or awards as the player picks choices and accumulates their associated points or awards. The player's regeneration total is the amount of points or awards that the player has received since the game provided a new set of picks. If the player's regeneration total displayed by indicator 124 meets or exceeds the regeneration amount 122, within the number or set of provided picks, the player receives a new set of picks, and the game resets the regeneration total of the indicator 124 to zero. Accordingly, if the player successfully reaches the goal amount, the game can provide the player with an additional bonus game, where the player can accommodate additional bonus awards.

The present invention contemplates providing a goal award after a player achieves an amount of points or awards equal to a goal amount. The goal award includes any award desired by the implementor, such as a number of game credits, game credit modifiers such as multipliers or a number of picks from a prize pool. The goal amount indicator 126 displays the goal amount. The goal amount preferably does not change in a game of the present invention, although the present invention includes different goal amounts in different games. In an example, the goal amount is initially set to one hundred points or awards and stays the same throughout the game.

In an alternative embodiment, gaming device 10 repeats the game after the player achieves an amount of points or awards equal to the goal amount. In the repeated game, the gaming device, in one embodiment, provides higher average awards and also makes it more difficult for the player's regeneration total to reach the regeneration amount 122 within the number of picks provided. In this embodiment, therefore, gaming device 10 may be adapted to issue, for example, two or more awards for every point that the player accumulates.

Alternatively, the goal amount varies throughout the course of the game. In one example, the goal amount is initially set to one hundred points or awards and changes to one hundred twenty if the player's regeneration total equals the regeneration amount one or more times. In another example, the goal amount is initially set to one hundred points or awards, the player achieves the goal amount and the goal award and the game starts over, wherein the goal amount is now two hundred points or awards. It should also be appreciated that the game can restart with the same goal amount as the first game. Accordingly, if the player is successful by reaching the goal amount, the game can provide the player with an additional bonus game where the player can accumulate additional bonus awards. The goal amount indicator 126 displays the goal amount and accordingly updates and displays any change.

The indicators 118, 120, 122, 124 and 126 may alternatively be electromechanical display devices mounted to the gaming device 10. Such electromechanical indicators are electrically connected to the processor 38 (See FIG. 2) such that they receive signals from the processor, display their identifying indicia in any suitable manner, translate the signals from the processor and display the appropriate amount.

Figure 8:
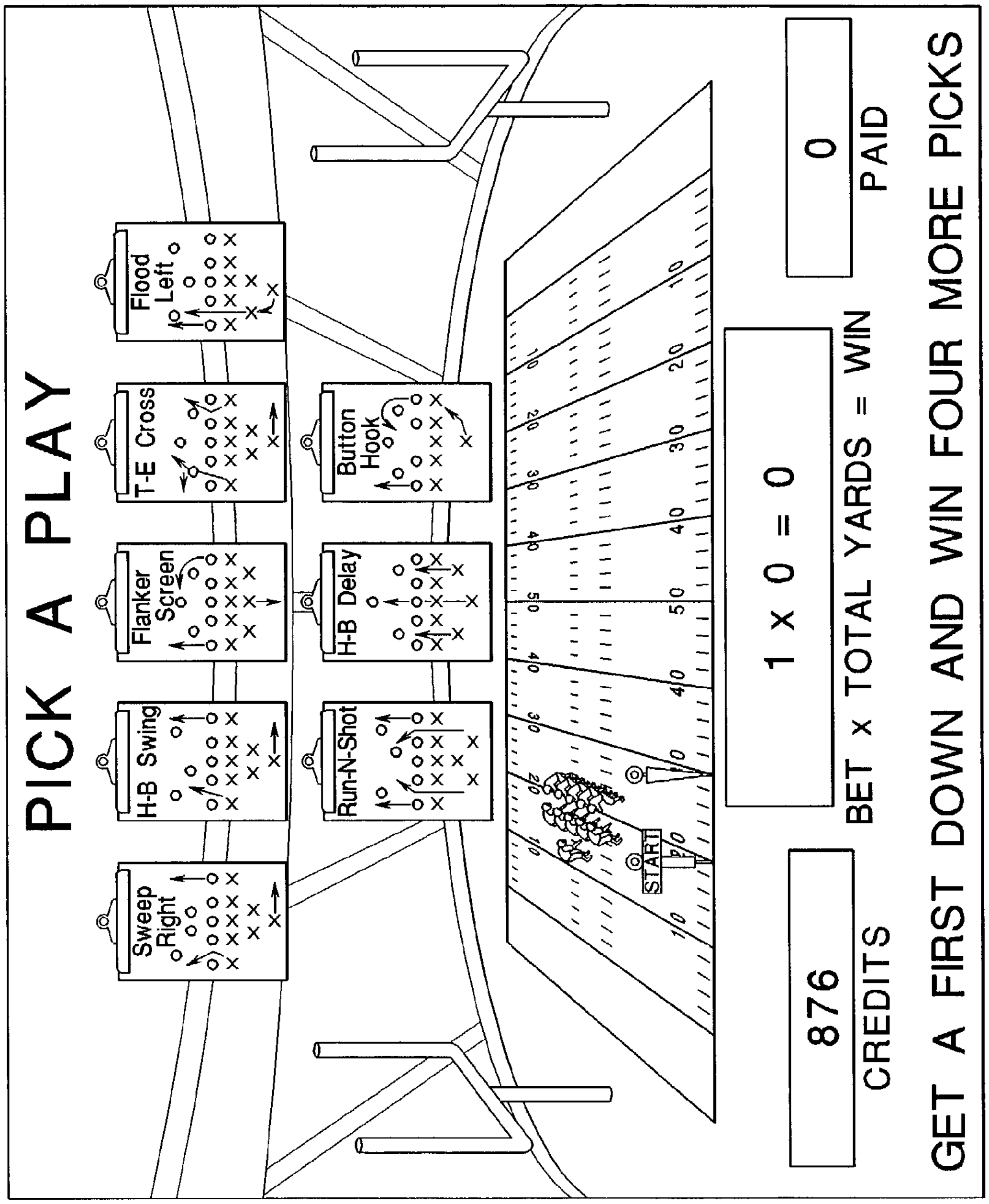
FIG. 8 is a graphical display of one example of one embodiment of the present invention.

Further alternatively, the regeneration amount indicator 122 and the goal amount indicator 126 include any implicit or explicit, static or dynamic displays that communicate the regeneration amount and goal amount, respectively. For example, one embodiment of the present invention is implemented in a football theme, wherein the regeneration amount indicator 122 is a message on the display device stating "GET A FIRST DOWN AND WIN FOUR MORE PICKS" as illustrated in FIG. 8. A player familiar with football knows that ten yards yields a first down and therefore knows or soon discovers that the regeneration amount is ten points or awards. In the same football example, the goal amount indicator 126 may message on the display device stating, in effect, "Score a touchdown and win a touchdown award." A player familiar with football knows that starting from a known yard-line, a touchdown requires one hundred points or awards less the player's current position on the field. A player starting on the twenty yard line therefore knows that the goal amount is eighty points or awards. In this implementation, the player accumulates awards as the player travels down the field, the points equal awards and the player wins the goal award if the player obtains a touchdown. If points do not equal awards, the player only wins the goal award. It should also be appreciated that awards could be provided to the player for achieving the regeneration amounts and that consolation awards could be provided to the player for not achieving the regeneration amount after the player uses all of the player's picks.

Referring now to FIGS. 4A through 4F, point or award pools 126, 128, 130, 132, 134 and 136 include awards that the game assigns to the choices of FIG. 3. In one embodiment where points equal awards provided to the player, the awards of the present invention include any item or number that translates into a pecuniary gain for the player. The awards, including the goal award, include gaming device credits and modifiers such as multipliers, wherein the multipliers multiply a tally of gaming device credits, such as the amount of a player's total bet, bet per payline, total win, win per payline or win from a bonus round game. The awards also include other types, such as a number of picks from a prize pool, wherein the prize pool includes, for example, gaming device credits.

The point or award pools 126, 128, 130, 132, 134 and 136 each include eight point totals or awards 140, wherein the game preferably randomly assigns each point total or award to one of the choices 102 through 116 (FIG. 3). The award pools alternatively include more point totals or awards 140 than choices, whereby the game does not assign one or more of the point totals or awards. The point or award pools further alternatively include less point totals or awards 140 than choices, whereby the game assigns one or more of the point totals or awards a plurality of times. The point or award pools still further alternatively include different amounts of point totals or awards such as one award pool having less point totals or awards than choices, one award pool having the same number and one award pool having more point totals or awards than choices.

The point or award pools 126 through 136 each include a percent range 142. The percent ranges 142 include percentages that correspond to the player's total accumulated points or awards, as indicated by the total point indicator 118, divided by the goal amount, as indicated by the goal amount indicator 126. In one embodiment, after the player's previous selection and before the game enables a further pick, the game determines the percentage, as described above, and selects the database having the percent range 142 that includes the determined percentage.

In one example of this embodiment, if the player's total points or awards after a previous selection is 40, as indicated by the total points indicator 118, and the goal award is 80, as indicated by the goal award indicator 126, the game determines the percentage to be 50%. The game selects the point or award pool 132 of FIG. 4D because its percent range 142 is 45% to 60% and therefore includes the determined percentage (i.e., 50%). The player's next pick therefore yields one of the point tables or awards from the award pool 132.

It should be appreciated that in an embodiment in which the number of point or award pools is equal to or less than the number of choices, each point or award pool may include a different percent range 142. In one embodiment in which the number of point or award pools is greater than the number of choices, one or more point or award pools may have overlapping percent ranges 142. Where two point or award pools include the same determined percentage, the game preferably randomly selects one of the point or award pools.

In this embodiment, the game randomly assigns the point tables or awards 140 of the appropriate point or award pool to the choices and masks the assignments from the player. In one embodiment, the game randomly assigns each point total or award 140 to a choice and maintains the assignment. For example, if the player has a total award of 40 and a goal amount percentage of 50%, the game employs the database 132. The game randomly assigns, for example: the 20 to the "B" choice 104; the −4 to the "D" choice 108; the 5 to the "F" choice 112; the 3 to the "E" choice 110; the 1 to the "A" choice 102; the 0 to the "H" choice 116; the −2 to the "G" choice 114 and the 2 to the "C" choice 106.

In this embodiment, the game only enables the player to select each choice once. The player selects the "A" and obtains the 1 point award. The player's total points or awards is now 41, and the goal amount percentage is still within the range of database 132. If the player has picks remaining, the game employs the same database 132 and preferably the same random generation as above, whereby the "A" is no longer selectable. The player selects the "G" and obtains −2 points or awards. The player's total points or awards is now 39, and the goal amount percentage is still within the range of database 132. If the player has picks remaining, this embodiment of the game employs the same database 132 and the same random generation as above, whereby the "A" and "G" are no longer selectable. Assigning each choice a point total or award 140 is preferred because when the player runs out of picks, the game preferably reveals the points or awards of the unselected choices and shows the player the picks that would have enabled the player to advance or obtain a goal award.

In an alternative embodiment, the same pool or database can be employed until the player uses all of the players picks before obtaining the regeneration amount or the player reaches the regeneration amount. For example, if the goal amount is 100, the regeneration amount is initially 35, the initial regeneration total is 25 and the player has four picks, the game will assign the points or awards from a single pool such as pool 128 (FIG. 4B) to the selections 102 to 116. If the player picks selection 104 or "B," and 7 points are associated with that selection, the regeneration total will be 32. Since the regeneration total does not equal the regeneration amount, the player picks another selection. The possible points or awards associated with the selections are still taken from pool 128 or remain as associated before the player's first pick because even though the percentage is now greater than 30 (i.e., 32%), the regeneration amount was not achieved and the player still has picks remaining.

In another alternative embodiment, the game randomly selects the points or awards that the player receives either up front or as the player picks choices. For example, a game employing the point or award pool 126 of FIG. 4A either randomly generates that the player receives "two" points or awards first, "one" point or award second, "six" points or awards third, etc., before the player makes any picks. Or, the player picks a first time and the game randomly generates "two" points or awards, the player picks a second time and the game randomly generates "one" point or award, the player picks a third time and the game randomly generates "six" points or awards, etc. In both cases, the choice the player picks is irrelevant to the result, i.e., picking any choice "A" through "H" yields the same result. This embodiment enables the generation of the same points or awards two or more times. This embodiment also enables the player to pick the same choice as many times as the player desires.

If the player exhausts the provided picks without generating a regeneration amount of points or awards, the game ends. That is, if the picks remaining indicator reaches zero before the regeneration total of the indicator 124 meets or exceeds the regeneration amount 122, the game ends. If the player generates the regeneration amount 122 before exhausting the provided picks, the player obtains a new or regenerated set of picks and the game accordingly resets the picks remaining indicator 120 and resets the regeneration total of the indicator 124.

In the embodiment described above, the game concurrently evaluates the player's total points or awards, as described above, to determine a goal amount percentage and the appropriate point or award pool. The dual evaluations create one scenario, in which the player achieves the regeneration amount and thus a new set of picks, but does not enter a new percent range 142. In this scenario, the game preferably employs the same point or award pool (e.g., 126 through 136) for two consecutive sets of picks. In the other embodiment described above, the pool is only changed when the regeneration amount is reached.

The dual evaluations create a second scenario in which the player achieves a point or award total that invokes a new percent range 142, but does not achieve the regeneration amount. In this scenario, the present invention includes two alternatives. In one alternative as described above, the game selects and employs the updated point or award pool having the percent range 142 that includes the newly determined percentage and randomly assigns the updated points or awards 140 to the choices. The player picks from the unselected and updated choices and attempts to regenerate a new set of picks. In the other alternative as described above, the game continues with the existing point or award pool having the percent range 142, which is less than the determined percentage. The game updates the point or award pool to reflect the determined percentage upon the regeneration of a new set of picks.

Consolation Embodiment

Referring now to FIGS. 5A through 5F, the present invention contemplates enabling a player to try for a consolation award 144 in the event that the player determines it is unlikely that the player's regeneration total will meet or exceed the regeneration amount before exhausting the provided picks. FIGS. 5A through 5F include the point or award pools 146, 148, 150, 152, 154 and 156, respectively, which are the pools 126 through 136 of FIG. 4 plus an associated consolation award 144 and an associated success percentage 158.

The consolation awards 144 include any amount desired by the implementor, are preferably different from one database to the next as illustrated, but alternatively may be the same for each database. The success percentages 158 which indicate a likelihood of obtaining the consolation award include any percentage desired by the implementor and are preferably different from one database to the next, but alternatively may be the same for each database. In FIGS. 5A through 5F, the consolation awards decrease as the percent ranges 142 increase. The success percentages 158 increase as the percent ranges 142 increase. In essence, the earlier in the game that the player attempts a consolation award 144, the less the success probability but the higher the consolation award. The present invention alternatively includes any value and success distribution desired by the game implementor.

Referring again to FIG. 3, a consolation choice 160, similar in form and structure to the choices 102 to 116, enables a player to stop an attempt to accumulate a regeneration amount and try for a consolation award. An astute player tries to accumulate awards until only one pick remains, as indicated in the picks remaining indicator 120. If on the last pick, it appears unlikely that the player will generate the regeneration amount (i.e., if the player needs a relatively large number of points or awards to reach the regeneration amount), the player may forego the opportunity to continue the game and opt for a higher value consolation award.

In the football game implementation described above, the consolation award is analogous to a field goal attempt. On fourth down, i.e., with one chance or pick remaining, the game enables the player to select a suitable field goal selection which is the consolation choice 160, which if successful yields a higher consolation value than attempting a fourth down play and not receiving a first down. A player familiar with football knows or soon learns that selecting the consolation choice 160 ends the game of the present invention.

It should be appreciated that the present invention preferably enables the player to select the consolation choice 160 and generate a consolation outcome with any number of picks remaining. It should also be appreciated that alternatively, the game may offer the attempt at a consolation award after the player has used all of the player's picks. It should further be appreciated that the game could change the number of picks when the player has achieved a certain percentage (described above). For example, the game may change the picks from four picks to three picks plus a consolation attempt.

Multiple Stage Embodiment

In the above embodiments, the game enables the player to achieve a point or award total that invokes a new percent range 142 while not achieving the regeneration amount and vice versa. Referring to FIGS. 6A through 6H, the present invention alternatively includes structuring the game to include a preset number of stages having corresponding tables 170, wherein each stage requires the player to achieve the regeneration amount of points or awards in order to advance to the next stage. Each table 170 includes point totals or awards 140 described above in connection with FIGS. 4A through 4F and FIGS. 5A through 5F. As above, the point totals or awards 140 are values that enable the player to advance to the next stage and corresponding table 170 but do not represent awards. Alternatively, the point total or awards 140 are values that enable the player to advance to the next stage and additionally represent awards.

In the embodiment of FIGS. 6A through 6H, the game preferably requires the player to advance through all the stages, e.g., eight stages, before awarding the player the goal award. That is, the game does not require a total amount of points or awards to win the goal award; rather, the player must advance through each stage. For each stage, the player must accumulate a regeneration total of points or awards from the stage's table 170 that meets or exceeds the preset regeneration amount within a defined set of picks to advance to the next stage.

In the tables 170 of FIGS. 6A through 6H, the point totals or awards 140 are chosen such that the player has an increasingly difficult time accumulating a regeneration amount in a provided number of picks. In this configuration, the player has an increasingly difficult time accumulating ten points or awards with four picks, which are the same parameters disclosed above. Also as above, the game randomly associates or assigns the point totals or awards 140 of the tables 170 to the choices 102 though 116 (FIG. 3) and maintains the association throughout the game play of the stage. The game alternatively randomly associates or assigns the point total or awards 140 of the tables 170 to the order in which the player picks choices, i.e., to pick one, pick two, etc.

Referring to FIG. 7, an alternative table 180 including the eight stages of FIGS. 6A through 6H illustrates an alternative method for enabling the player to play the stage by stage embodiment of the present invention. Each stage has an associated success percentage 182, whereby the game generates an advance or a no advance for each stage. The success percentages 182 are preferably high for earlier stages and steadily decrease as the player advances through the stages. Once the game generates an advance or a no advance, the game generates point totals or awards 140 from one or more tables 170 that cumulatively illustrate an advance or no advance outcome to the player. This method enables the game to present exciting scenarios, for example, a zero award, followed by another zero, followed further by a ten award to illustrate an advance outcome.

The embodiment of FIGS. 6A through 6H and FIG. 7 includes awarding the player in a plurality of ways. The game includes only providing a goal award to the player who advances through each of the eight stages. The game includes providing an advancement award to the player each time the player advances through a stage. The advancement award includes being predetermined or being the number of awards 140 accumulated from the table 170 during the play of the stage. The game further includes providing a predetermined advancement award in addition to providing the number of awards 140 accumulated from the table 170 during the play of the stage. Regardless of the award alternative employed, the game preferably provides the goal award after advancing through all the stages.

The alternative embodiment also contemplates providing the consolation award 144 (FIGS. 5A through 5F) at any time by picking the consolation selector or choice 160 (FIG. 3). As disclosed in connection with FIGS. 5A through 5F, the alternative embodiment of FIGS. 6A through 6H includes decreasing, increasing or maintaining the consolation awards in later stages. The alternative embodiment also includes providing success percentages 158 that increase or decrease in later stages. Preferably as above, the earlier in the game that the player attempts a consolation award 144, the less the success probability but the higher the consolation award.

Increasing Goal Advancement Embodiments

Figure 9A:
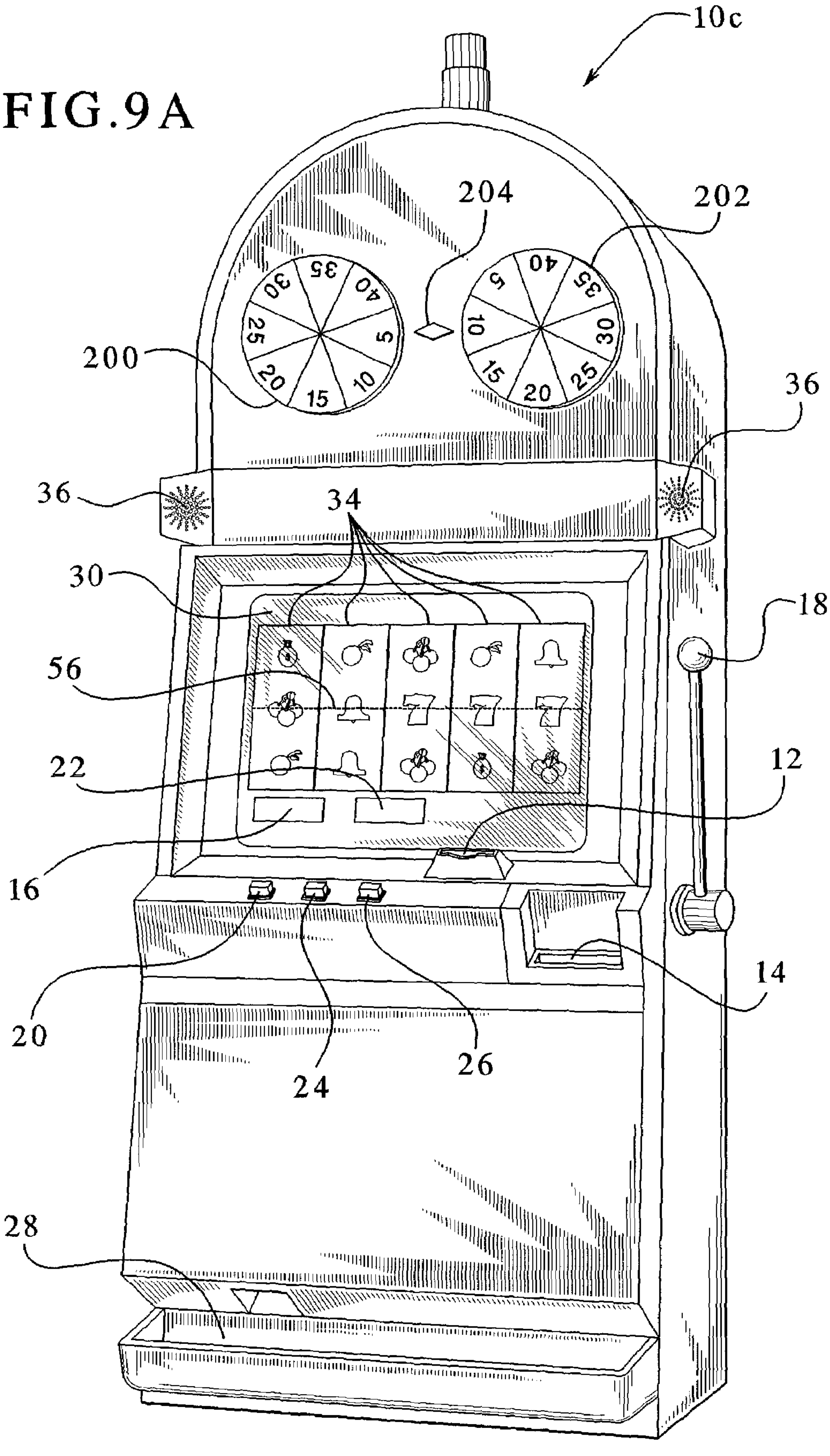
FIG. 9A is a front-side perspective view of one embodiment of the gaming device of the present invention.
Figure 9B:
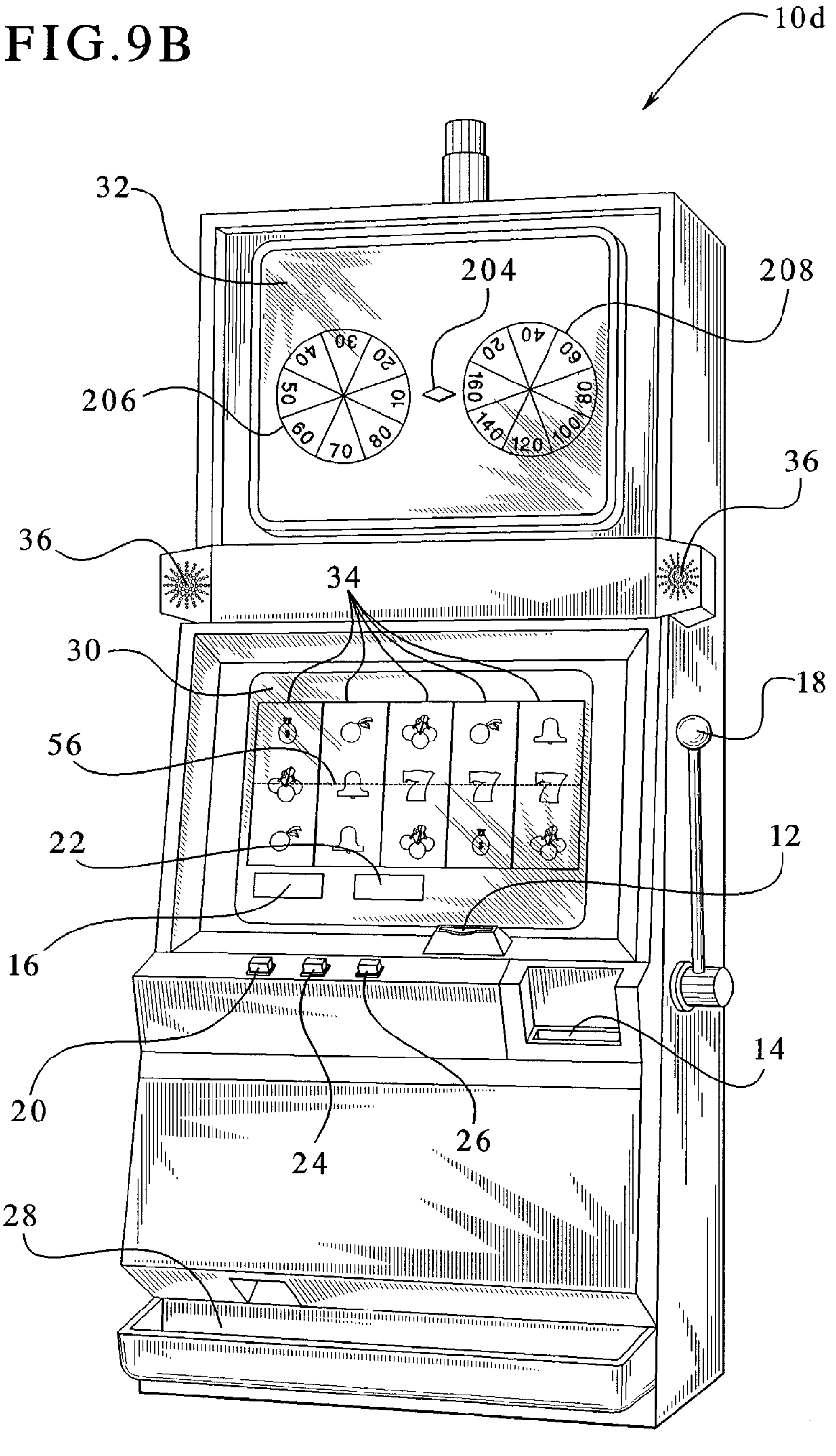
FIG. 9B is a front-side perspective view of another embodiment of the gaming device of the present invention.

Referring now to FIGS. 9A through 9B, two embodiments of the gaming device of the present invention are illustrated as gaming device 10*c* and gaming device 10*d*, respectively. Gaming device 10*c* and gaming device 10*d* are substantially similar to gaming devices 10*a* and 10*b* of FIGS. 1A and 1B and are generally referred to herein as gaming device 10. A description of the basic features of gaming device 10 will be omitted since they have already been discussed with reference to FIGS. 1A and 1B. However, the increasing goal advancement features of the two embodiments illustrated in FIGS. 9A and 9B are discussed below.

FIG. 9A illustrates a gaming device 10*c* having a value generator including two mechanical wheels 200 and 202 and an award indicator 204. The value generator in this embodiment includes mechanical wheels 200 and 202 which each have a plurality of predetermined numerical values thereon. However, it should be appreciated that any suitable type of mechanical distribution device could be used. For example, mechanical reels could be used as a value generator. Further, it should also be appreciated that any suitable number of mechanical reels or wheels could be used as the value generator.

As described above, The value generator in this embodiment includes mechanical wheels 200 and 202 which each have a plurality of predetermined numerical values thereon. The award indicator 204 indicates a numerical value from each of the respective wheels 200 and 202 to determine a player's score. However, it should be appreciated that numerical values are not required and the values could be indicated by any suitable predetermined symbol. For example, a plurality of predetermined alphanumeric symbols, picture symbols, graphical symbols, multiplier symbols or combinations thereof could be used to determine a player's score.

FIG. 9B, like FIG. 9A, illustrates a gaming device 10*d* having a value generator including two video wheels 206 and 208 and an award indicator 204. The two video wheels 206 and 208 are displayed on an upper display device 32. It should be appreciated that other types of value generators could be employed such as a value generator including video reels.

Figure 10:
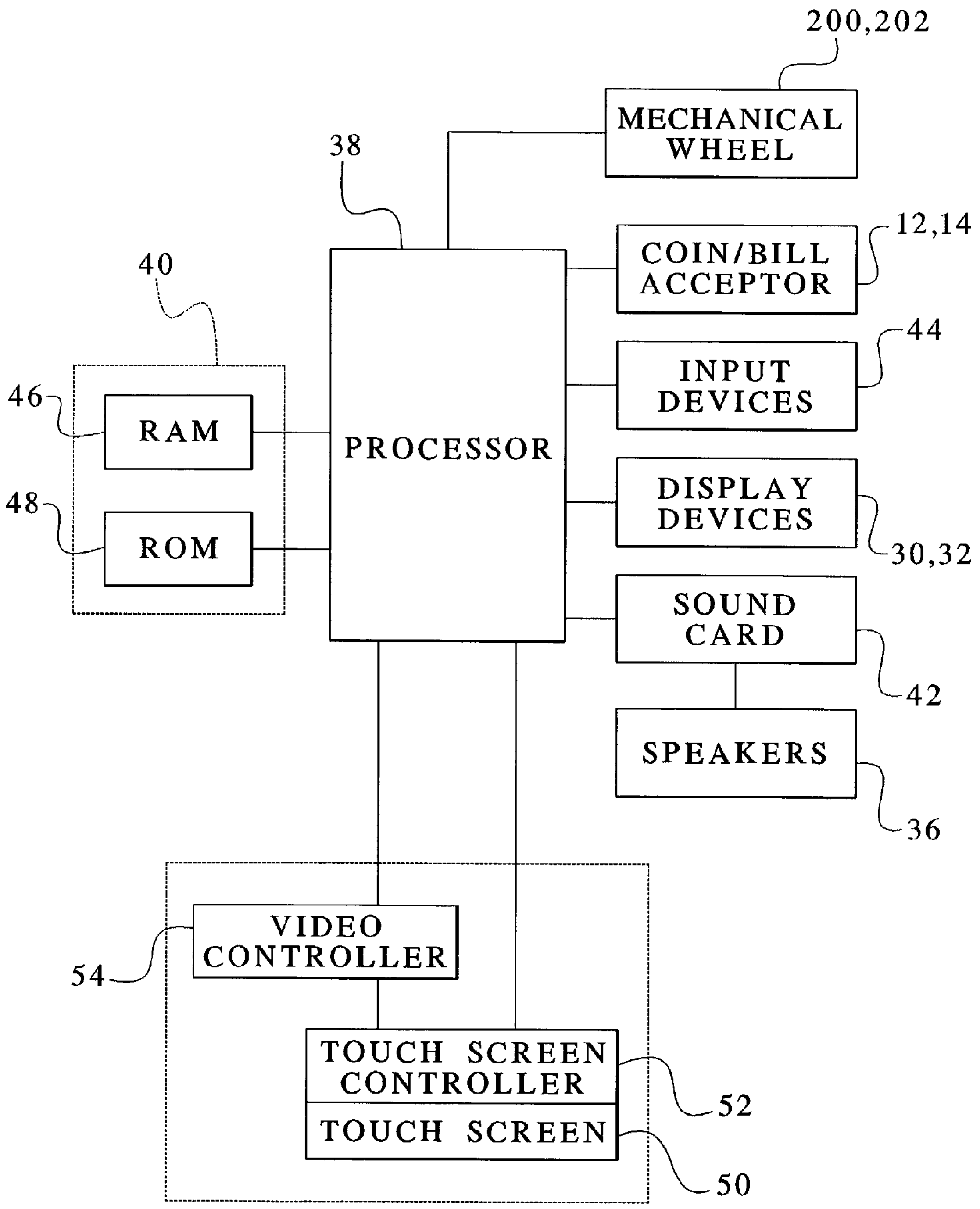
FIG. 10 is a schematic block diagram of the electronic configuration of one embodiment of the gaming device of the present invention.

Referring to FIG. 10, a schematic block diagram illustrates the electronic configuration of the embodiment of the gaming device 10 of the present invention as shown in FIG. 9A. The electronics are substantially similar to those described above with reference to FIG. 2. Accordingly, a description thereof will be omitted. However, the electronic configuration shown in FIG. 10 further includes a value generator such as mechanical wheels 200 and 202 which are controlled by the processor 38. Thus, the processor 28 is configured to operate the mechanical wheels 200 and 202 to enable the determination of the player's score.

Figure 11A:
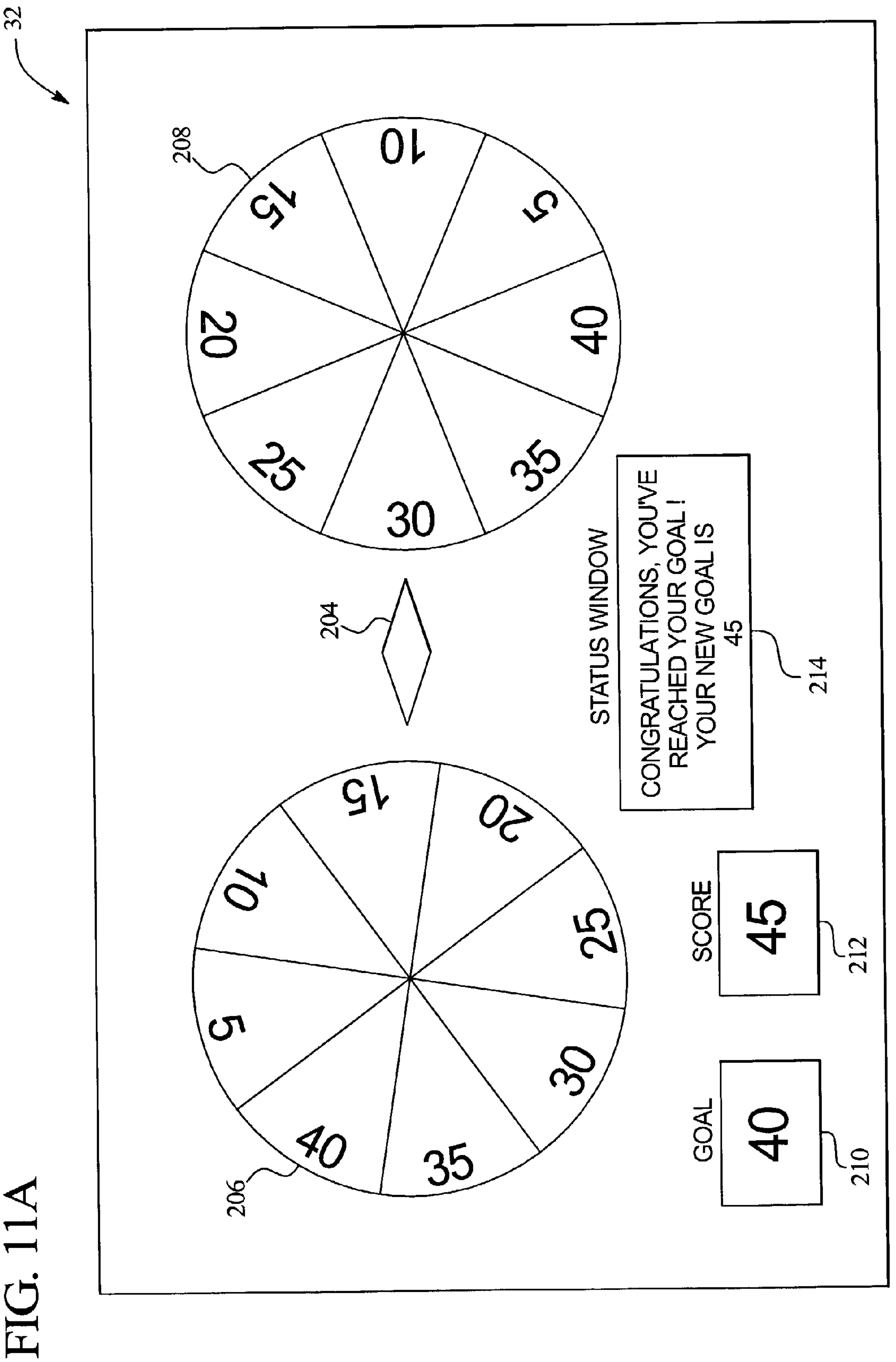
FIGS. 11A to 11C are enlarged front elevation views of one of the display devices of FIGS. 1A and 1B illustrating one embodiment of the present invention.

Referring now to FIG. 11A, an upper display device 32 generally illustrates one embodiment of the present invention. The game in this embodiment is a game having an increasing goal advancement. This embodiment includes, as a value generator, a set of video wheels 206 and 208, each of the video wheels 206 and 208 having a plurality of predetermined numerical values thereon. Further, this embodiment includes an award indicator 204 for determining a score 212 obtained by a player.

In this embodiment, the player is presented with a goal 210 which they must achieve in order to keep playing. In one embodiment, the player's score 212 as indicated by award indicator 204 must be greater than or equal to the goal 201 in order to achieve the goal 210. If the player fails to achieve the goal, the game will terminate. The goal 210 can be randomly generated, or it can be associated with an element of the game. If the player achieves the goal 210, the goal 210 is advanced. In one embodiment, the goal 210 is advanced by increasing the numerical value of the goal 210. In one embodiment, the goal 210 is increased to the value of the player's score 212 which achieved the previous goal.

In an alternative embodiment, the player's score 212 must be less than or equal to the goal 210 in order to achieve the goal 210. In the alternative embodiment, the goal 210 is advanced by decreasing numerical value the goal 210. In one embodiment, the goal 210 is decreased to the value of the player's score 212 which achieved the previous goal.

Preferably, in a video embodiment, the video wheels 206 and 208 are spun to determine the player's score. In one embodiment, the wheels 206 and 208 are spun automatically as part of a free spin mode. In one alternative embodiment, the player presses a button (not shown) to activate the wheels 206 and 208. Once the wheels 206 and 208 come to rest, the values indicated by the award indicator 204 are added together and displayed as the player's score 212. In this embodiment, the award indicator 204 indicates two values, "15" and "30" which are added together to yield the player's score 212 of "45."

The player's score 212 of "45" is greater than the goal 210 of "40." Thus, the player has reached the goal and the goal 210 is advanced or increased to "45" as indicated by status window 214. Thus, upon achieving the goal 210 of "40," the goal 210 is advanced or increased. In this embodiment, the goal 210 is increased to the player's score 212 of "45."

It should be appreciated that in alternative embodiments, the next goal could be set in a variety of suitable fashions. For instance, in one embodiment, the goal randomly increases as it advances. Alternatively, the goal could randomly decrease as it advances. Further, the goal could increase or decrease by a predetermined number, or the goal could be multiplied or divided by a predetermined number to obtain the new goal.

Figure 11B:
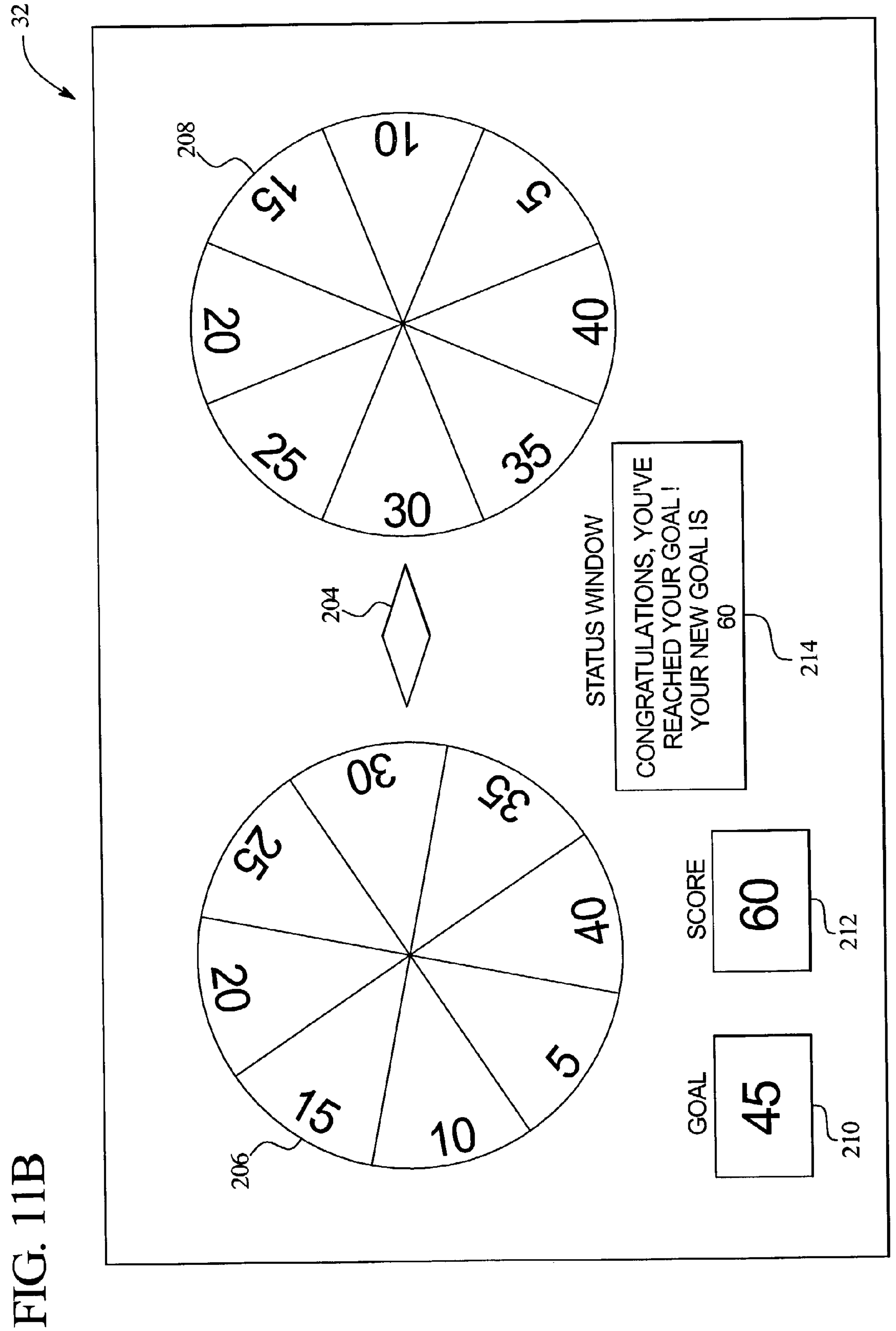

Referring now to FIG. 11B, the goal 210 has been updated to reflect the advancement from "40" to "45." Thus, the player must now obtain a score that is greater than or equal to "45" in order to achieve the goal and continue playing the game. If the player does not achieve the goal 210 of "45," the game will automatically terminate. As shown in FIG. 11B, the player's score 212 as indicated by award indicator 204 is "60." Accordingly, the player's score 212 is greater than the goal 210. Again, the player has achieved the goal as indicated by status window 214. The player will be allowed to continue playing, but the goal 210 will be increased or advanced to "60" as indicated by status window 214.

In FIG. 11B, the goal 210 was updated to reflect the advancement from "40" to "45," but the predetermined numerical values on each of the video wheels 206 and 208 did not change. It should be appreciated that in alternative embodiments, one or more or all of the predetermined numerical values could be modified as the goal advances. In one embodiment, as the goal value increases during advancement, the predetermined numerical values one each of the video wheels 206 and 208 increase, thereby enabling the player to more readily achieve a higher goal value. In one embodiment, as the goal value decreases during advancement, the predetermined numerical values one each of the video wheels 206 and 208 decrease, thereby enabling the player to more readily achieve a lower goal value. In one alternative embodiment, as the goal advances, the predetermined numerical values are modified to lower the probability of the player achieving the goal value, thereby increasing the difficulty of achieving the goal as the goal advances.

Further, it should also be appreciated that the symbols on the video wheels 206 and 208 are not required to be numerical values. The symbols could be numbers, letters, pictures, graphics, multipliers, the like and combinations thereof. For instance, in one embodiment, video wheel 206 could include predetermined numerical values while video wheel 208 includes predetermined pictures which represent a value or an action. Further, it should be appreciated that the type of symbol on the video wheels 206 and 208 can change as the goal advances. For instance, video wheels 206 and 208 could both initially include predetermined numerical values, but after the goal advances, video wheel 208 could be modified to include predetermined multiplier values in place of the predetermined values.

Figure 11C:
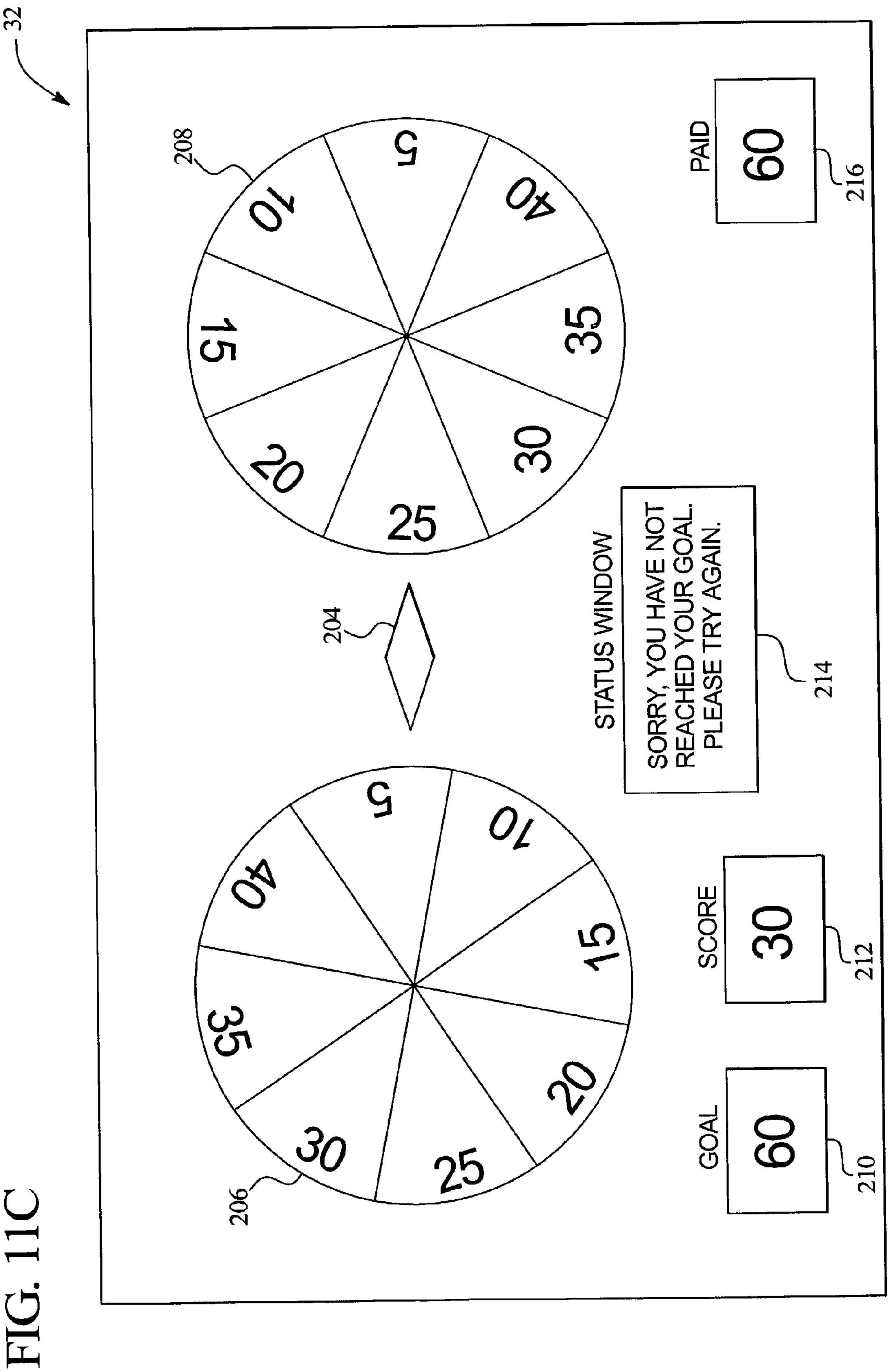

Referring now to FIG. 11C, the goal 210 has been advanced or increased to "60" as previously indicated. Thus, the player must now obtain a score that is greater than or equal to "60" in order to achieve the goal and continue playing the game. If the player does not achieve the goal 210 of "60," the game will automatically terminate. As shown in FIG. 11C, the player's score 212 as indicated by award indicator 204 is only "30." Accordingly, the game will automatically terminate as indicated by status window 214.

Even though the game has terminated, the player is paid an award 216 for obtaining at least one goal or award level. In this embodiment, the player's award advances with the current goal or award level. Thus, since the player advanced the goal or award level 210 to "60," the player is paid an award 216 of "60." In this embodiment, the player's award 216 is associated with the goal or award level 210 at the time the game terminated. In alternative embodiments, the award 216 may be determined in a different fashion. For instance, the player's award might be based on the number of goals or award levels obtained by the player.

Figure 11D:
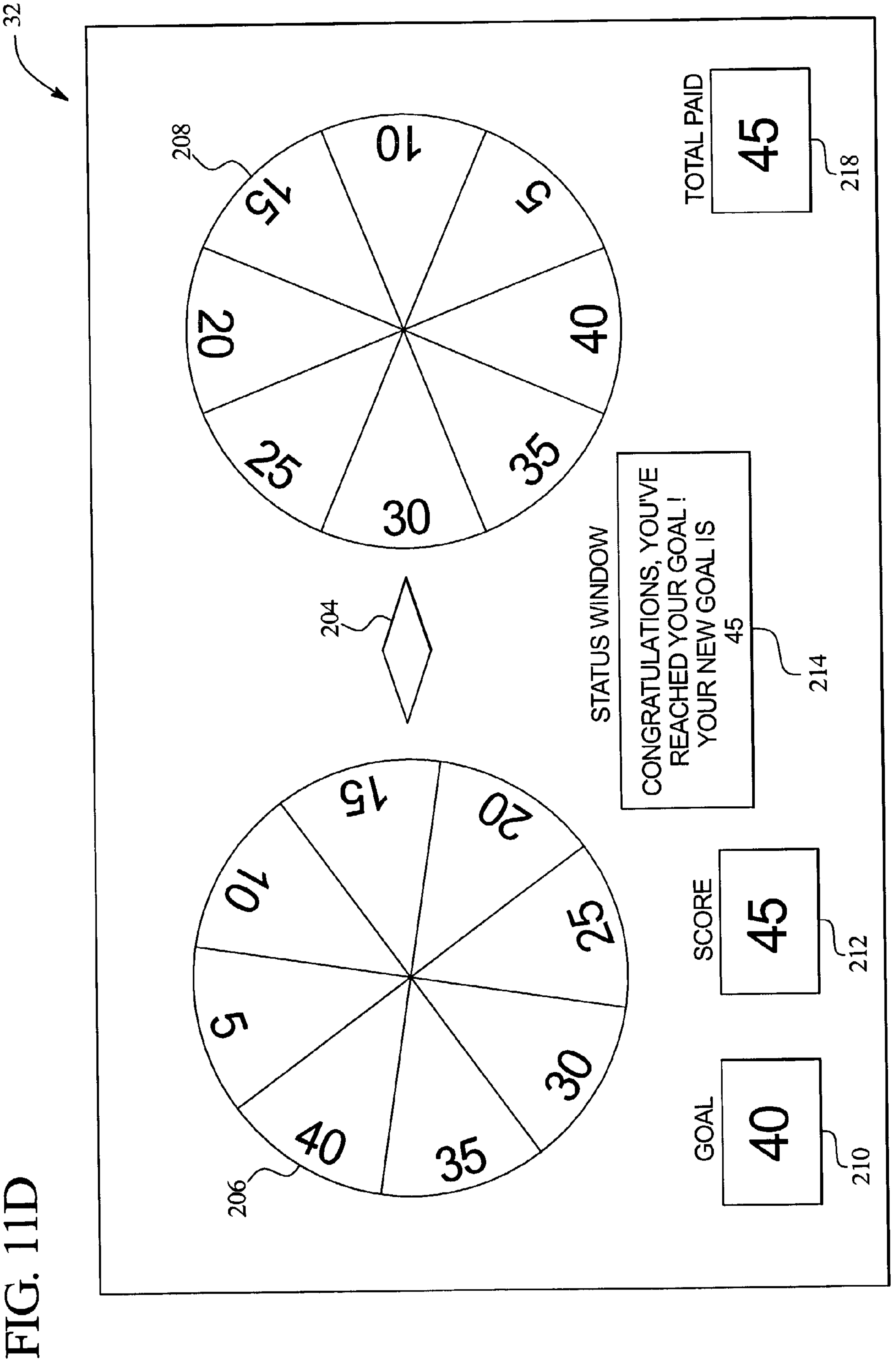
FIGS. 11D to 11F are enlarged front elevation views of one of the display devices of FIGS. 1A and 1B illustrating another embodiment of the present invention.

Referring now to FIG. 11D, an upper display device 32 generally illustrates one embodiment of the present invention. This embodiment is substantially similar to the embodiment described with reference to FIGS. 11A to 11C. However, in this embodiment, the award given to the player is not based on the goal at the time the game terminates. Rather, the award received by the player in this embodiment is based on the cumulative total of the player's scores upon achieving each goal. In this embodiment, an award level includes the player's score upon achieving each goal and the total award received by the player is the sum of the award levels. Thus, the player does not receive an award if the player fails to achieve at least one goal.

As shown in FIG. 11D, the goal 210 is "40" and the player has obtained a score of "45" as indicated by award indicator 204. The player has reached or achieved their goal and the goal has been advanced to "45" as indicated by status window 214. Further, since the player has achieved at least one goal, the player has obtained one award level and received an award of "45" as indicated by award window or total paid window 218. The award 218 of "45" is equal to the first award level, that is, the player's score upon achieving the first goal.

Figure 11E:
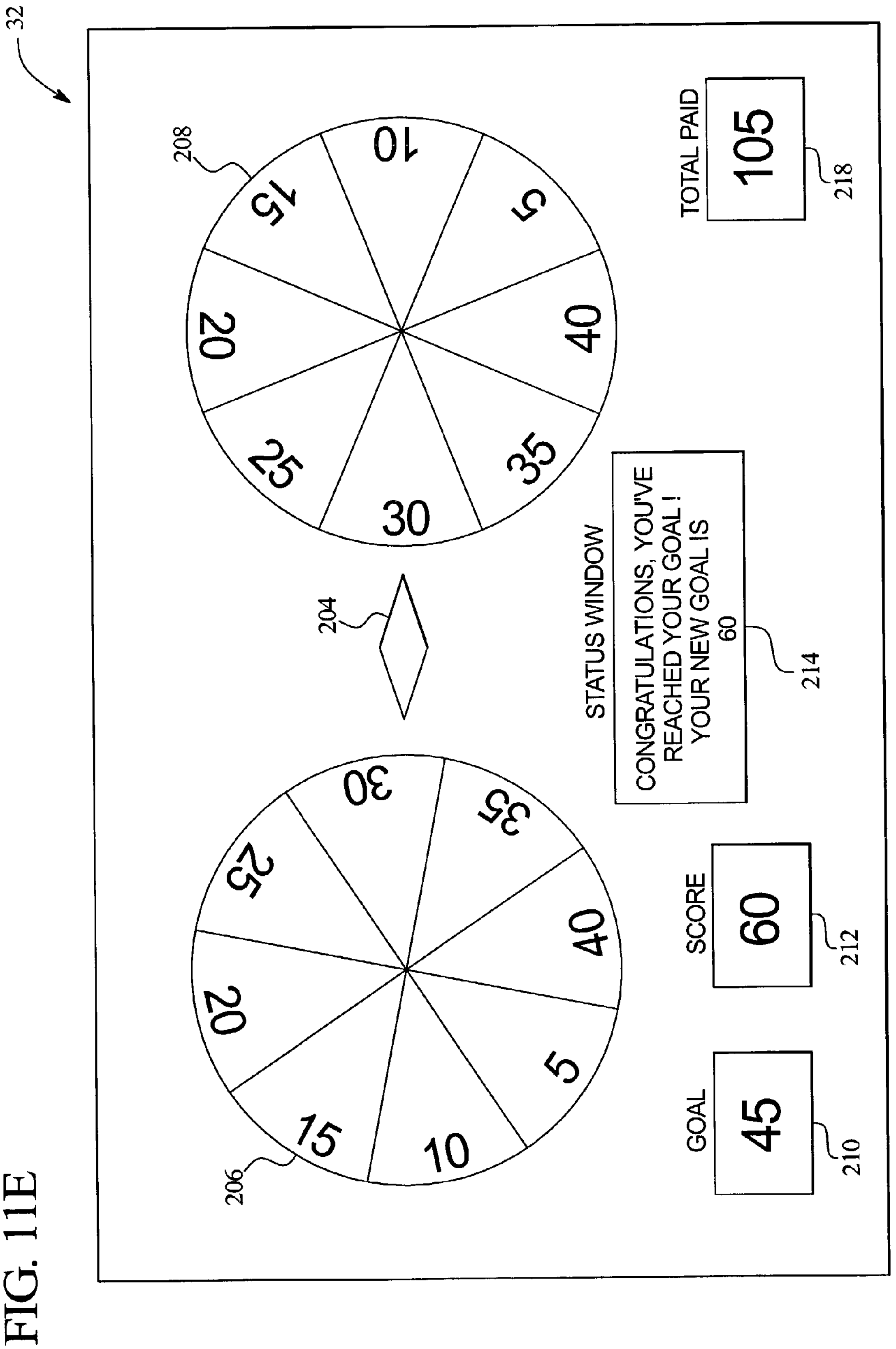

The player continues playing the game with an increased goal of 45 as indicated by goal window 210 of FIG. 11E. In FIG. 11E, the player has obtained a score 212 of "60" as indicated by award indicator 204. The player's score 212 of "60" is greater than the goal 210 of "45." Thus, the goal is advanced once again as indicated by status window 214 to a new goal of "60." The player's award 218 is also advanced by the score of the player upon achieving the second goal. Thus, the player's score of "60" for obtaining a second award level is added to the player's previous score of "45" for obtaining the first award and the player receives a total award 218 of "105."

Figure 11F:
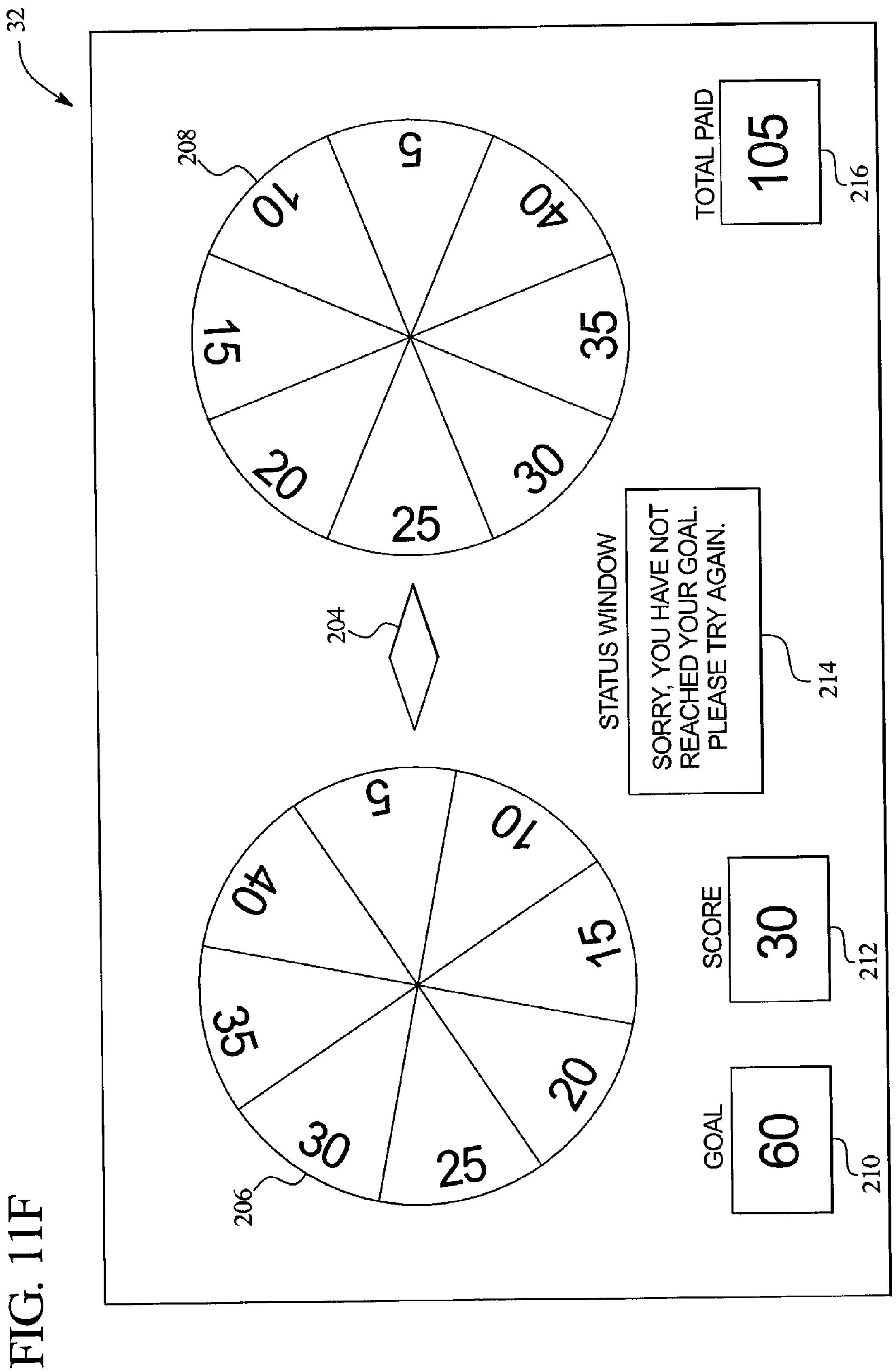

Referring now to FIG. 11F, the goal 210 has been increased to "60."

The player must obtain a score 212 of "60" in order to achieve the goal and continue playing the game. The player has only obtained a score 212 of "30" as indicated by award indicator 204. Thus, the game automatically terminates since the player's score 212 is not greater than or equal to the goal 210. However, the player is still paid a total award 218 of "105," which is the cumulative total of the two award levels obtained by the player, that is, the total of the player's scores upon achieving each previous goal. In alternative embodiments, the total award 218 could be based on the cumulative total of the actual goals 210 achieved by the player, that is, each award level would be equal to its associated goal.

Figure 11G:
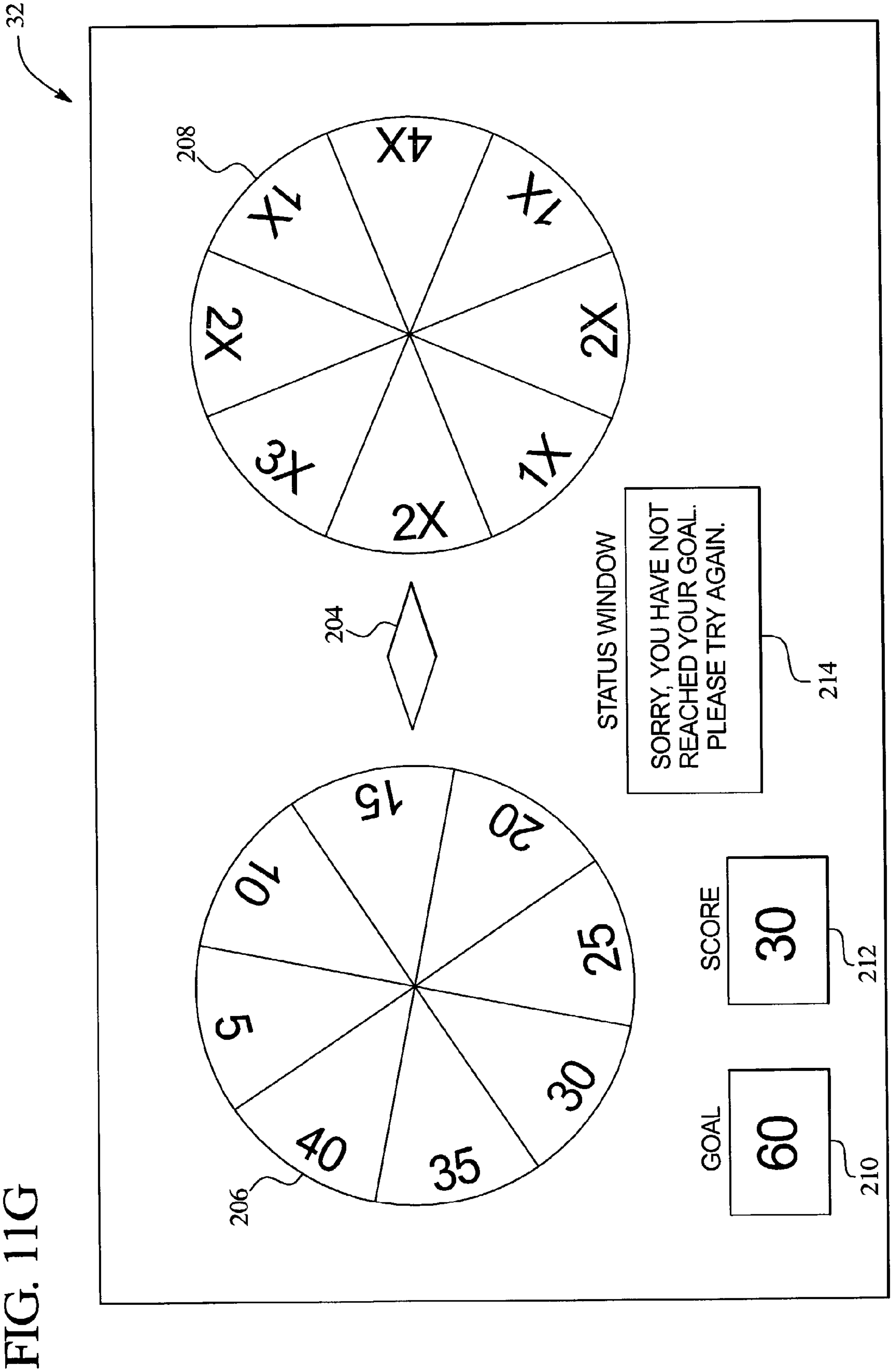
FIG. 11G is an enlarged front elevation view of one of the display devices of FIGS. 1A and 1B illustrating another embodiment of the present invention.

Referring now to FIG. 11G, another embodiment of the gaming device 10 of the present invention is illustrated on a central display device 32. In this embodiment, video wheel 208 displays a plurality of multiplier values rather than a plurality of predetermined numerical values. In this embodiment, video wheel 206 displays a plurality of predetermined numerical values like the video wheels of the two previous embodiments. Award indicator 204 indicates a number on wheel 206 and a multiplier on wheel 208. The player's score 212 is determined by multiplying the number indicated on wheel 206 by the multiplier indicated on wheel 208. Thus, the score 212 of "30" is determined when "15" is multiplied by "2."

The score 212 of "30" is not greater than the goal 212 of "60." The player has failed to achieve the goal and the game will automatically terminate. Since the player failed to achieve or obtain at least one goal, the player does not receive an award. However, in one alternative embodiment, the player might be awarded a predetermined consolation award if they fail to achieve at least one goal. In one embodiment, the consolation award is the score obtained by the player. Thus, the player would collect the score 212 of "30," but the game would still terminate.

Figure 12A:
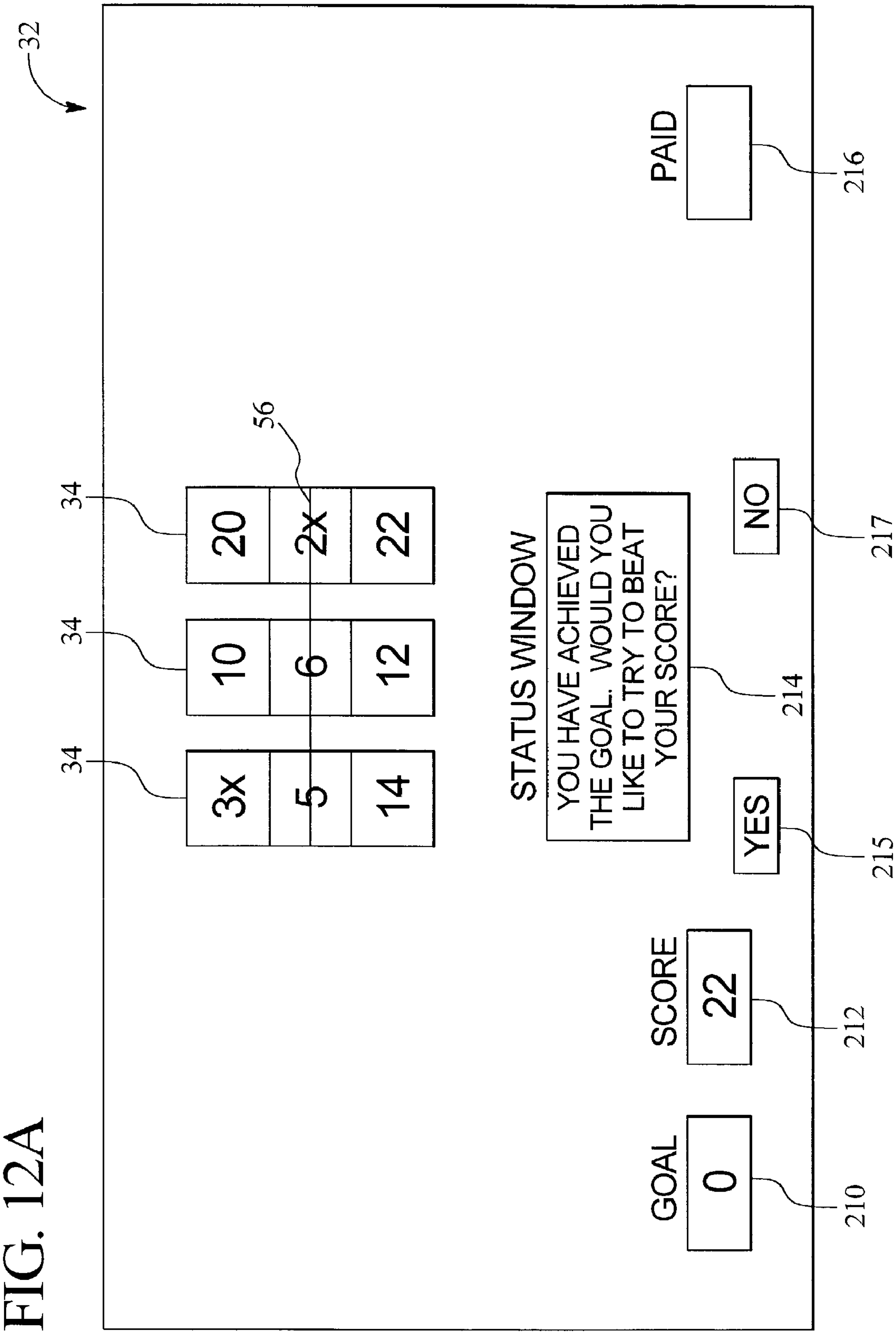
FIGS. 12A to 12E are enlarged front elevation views of one of the display devices of FIGS. 1A and 1B illustrating one embodiment of the present invention.

Referring now to FIG. 12A, an upper display device 32 generally illustrates one embodiment of the present invention. The game in this embodiment is a game having an increasing goal advancement coupled with an offer and acceptance feature. This embodiment includes, as a value generator, a set of video reels 34. Each of the video reels 34 have a plurality of predetermined numerical values and multiplier values thereon. Further, this embodiment includes a payline 56 for determining a score 212 obtained by a player.

In this embodiment, the goal is based on a player's previous score and the goal is achieved when the player's score beats their previous score. Thus, the goal advances if the player's score is greater than their previous score. The first goal is set without reference to the player's score. In this embodiment, the first goal is zero as indicated by goal window 210. Thus, the player must obtain a score greater than zero to advance the goal. Alternatively, the first goal could be a randomly selected number or a different predetermined number.

In this embodiment, the player presses a button (not shown) to activate the reels 34. In one alternative, the reels 34 are activated automatically. Once the reels 34 come to rest, the values indicated across the payline are added together and displayed as the player's score 212. If a multiplier occurs on one of the reels 34, the sum of the preceding value or values is multiplied by the multiplier value rather than being added. In this embodiment, the payline 56 indicates two values, "5" and "6" and one multiplier value, "2×." The two values, "5" and "6" are added together to yield a value of "11." The value of "11" is then multiplied by two (i.e., the multiplier value of "2×") to yield the player's score 212 of "22." The player's score 212 of "22" is greater than the goal 210 of "0." Thus, the player has achieved the first goal as indicated by status window 214.

After achieving the first goal, the player is presented with an offer as indicated by status window 214. The player now has the option of trying to beat their score. If the player declines the offer by pressing the "NO" button 217, then the player collects an award equal to the score 212 of "22" which they obtained during the game and the game ends. However, if the player accepts the offer and chooses to try to beat their score by pressing the "YES" button 215, then the game continues and the player must try to beat their score 212 of "22."

Figure 12B:
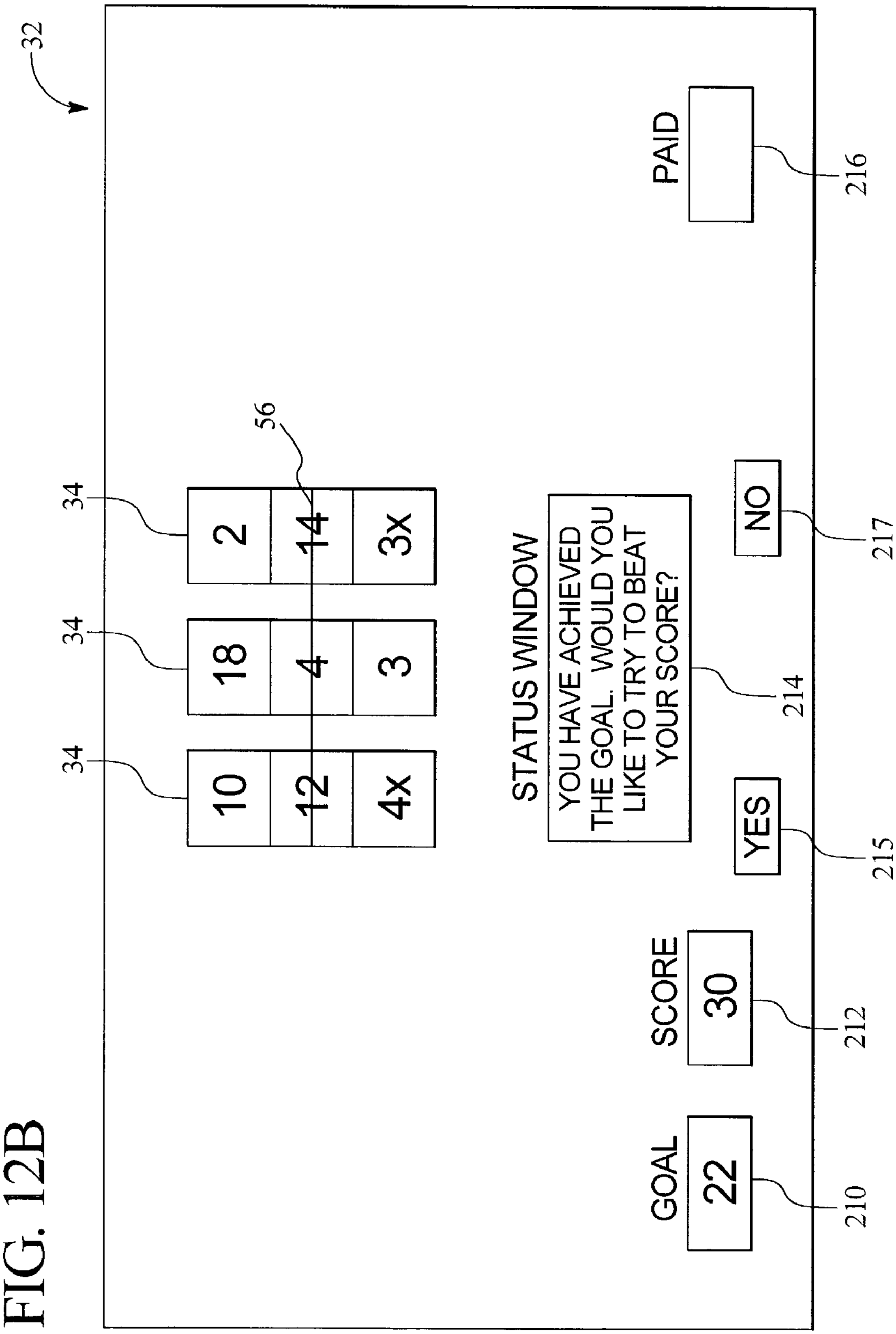

Referring now to FIG. 12B, the player has accepted the offer by choosing to the try to beat their score and the goal 210 has been updated to reflect the advancement from "0" to "22." Thus, the player must now obtain a score that is greater than "22" in order to achieve the goal and continue playing the game. If the player does not achieve the goal 210 of "22," the game will automatically terminate and the player will not collect an award. Accordingly, the player risks not obtaining any award for the chance to obtain a higher award. In this embodiment, the probability of achieving each successive goal decreases as each goal is achieved. Thus, the player can try to beat their score and obtain a higher award, but the chances of obtaining a higher award decrease with each successive goal that is achieved.

The player's score 212 as indicated by payline 56 is "30." Accordingly, the player's score 212 of "30" is greater than the goal 210 of "22" meaning that the player has achieved the goal as indicated by status window 214. Again, the player is presented with an offer, allowing them to try to beat their score as indicated by status window 214. Thus, the player has the option of collecting an award equal to their score 212 of "30" by pressing the "NO" button 217, or the player can try to beat their score 212 of "30" by pressing the "YES" button 215.

Figure 12C:
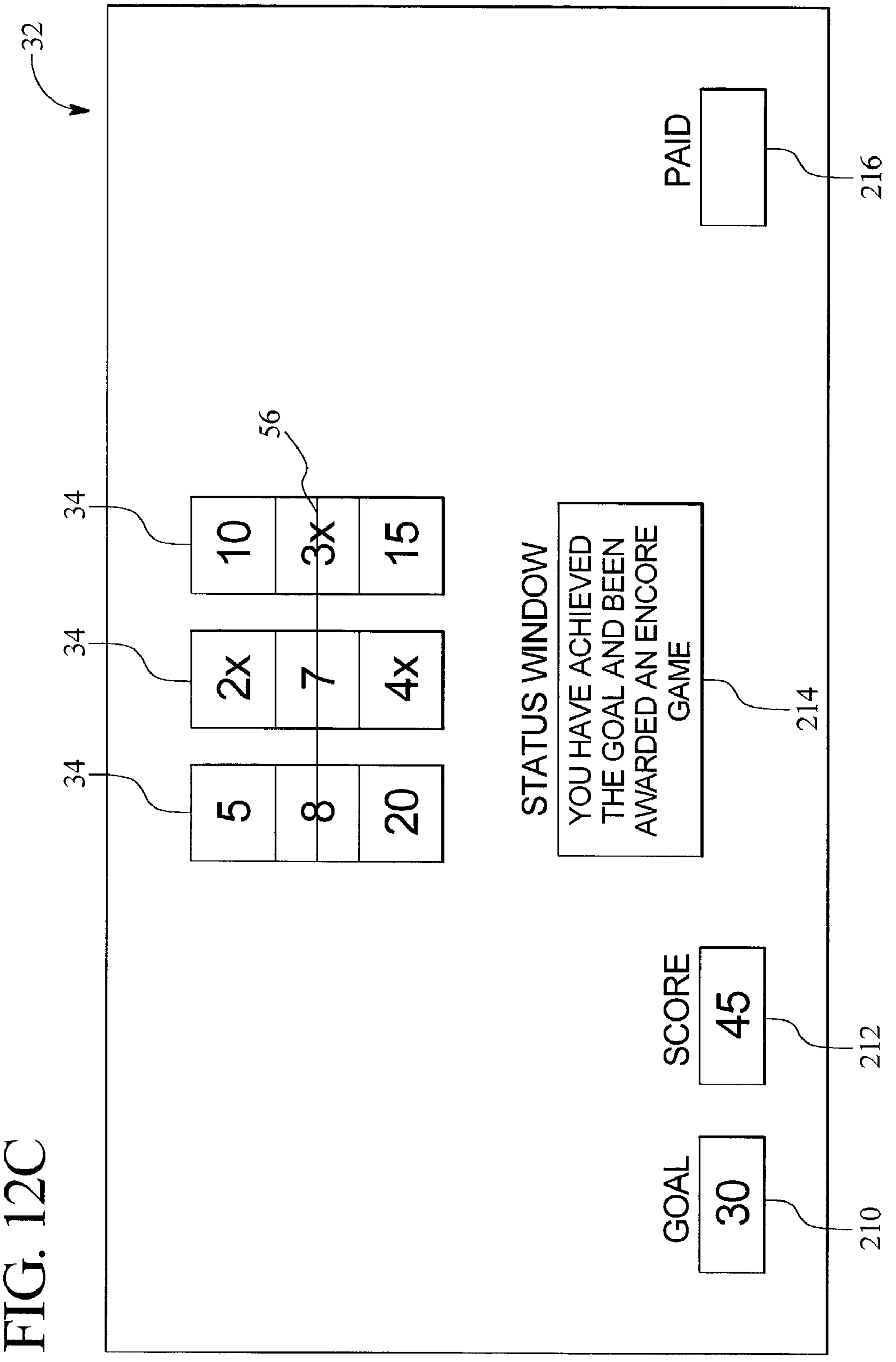

Referring now to FIG. 12C, the player accepted the offer by choosing to try to beat their score and the goal 210 has been updated to reflect the advancement from "22" to "30." Thus, the player must now obtain a score that is greater than "30" in order to achieve the goal and continue playing the game. If the player does not achieve the goal 210 of "30," the game will automatically terminate and the player will not collect an award.

The player's score 212 as indicated by payline 56 is "45." Accordingly, the player's score 212 of "45" is greater than the goal 210 of "30" meaning that the player has achieved the goal as indicated by status window 214. However, the player has also been awarded an encore round or game as indicated by status window 214. In this embodiment, the encore round is awarded randomly to the player during the game. Upon being awarded the encore round, the player is awarded their current score 212 of "45" as an award and the goal is reset to the first goal of zero.

Figure 12D:
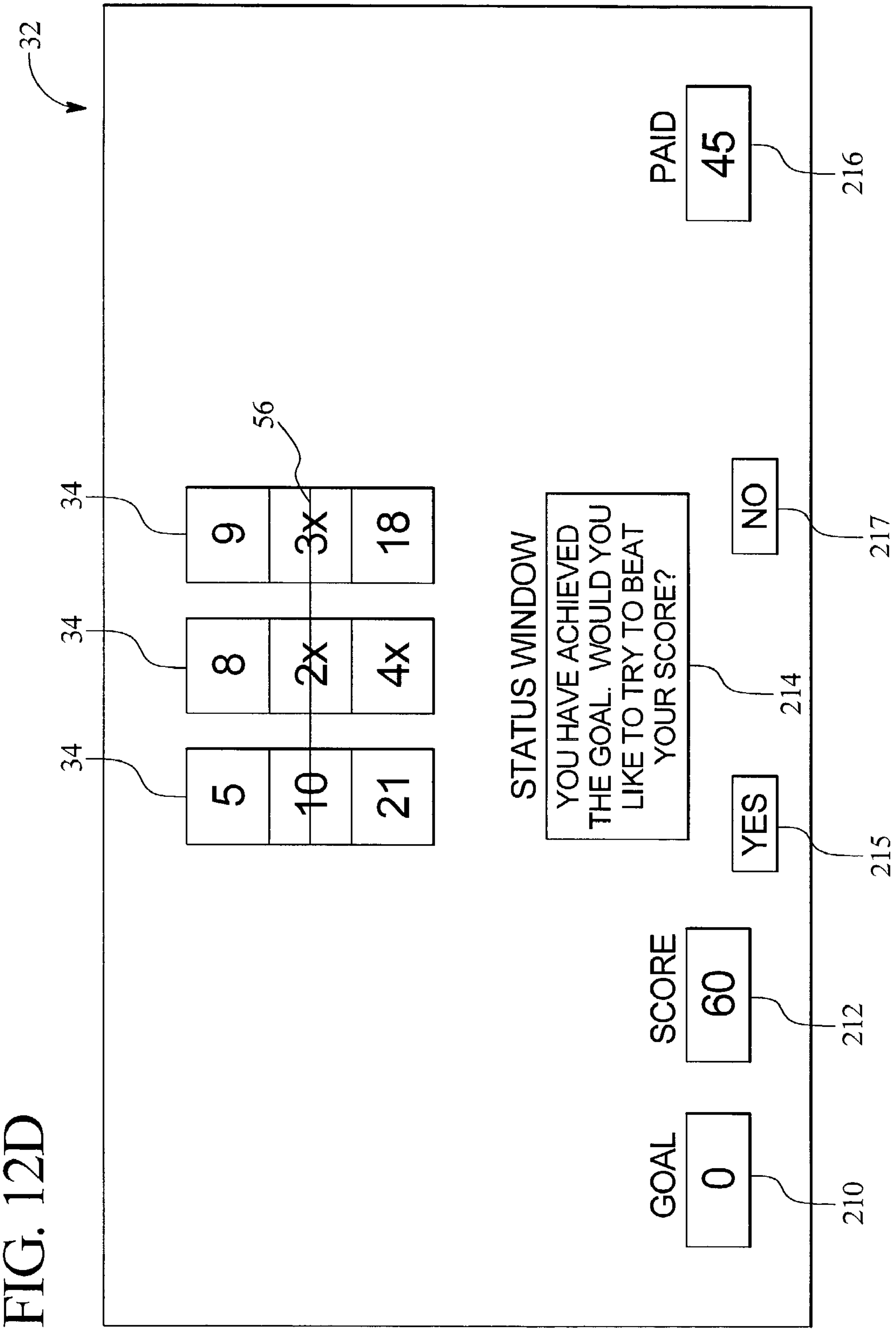

Referring now to FIG. 12D, the player has begun playing the encore round. Accordingly, the goal 210 has been reset to the first goal of zero. In addition, the paid window 216 indicates that the player has been paid an award of "45" which is equal to the player's previous score when they were awarded the encore round.

The player's score 212 as indicated by payline 56 is "60." Accordingly, the player's score 212 of "60" is greater than the goal 210 of "0" meaning that the player has achieved the goal as indicated by status window 214. Again, the player is asked if they would like to try to beat their score as indicated by status window 214. Thus, the player has the option of collecting an award equal to their score 212 of "60" by pressing the "NO" button 217, or the player can try to beat their score 212 of "60" by pressing the "YES" button 215.

Figure 12E:
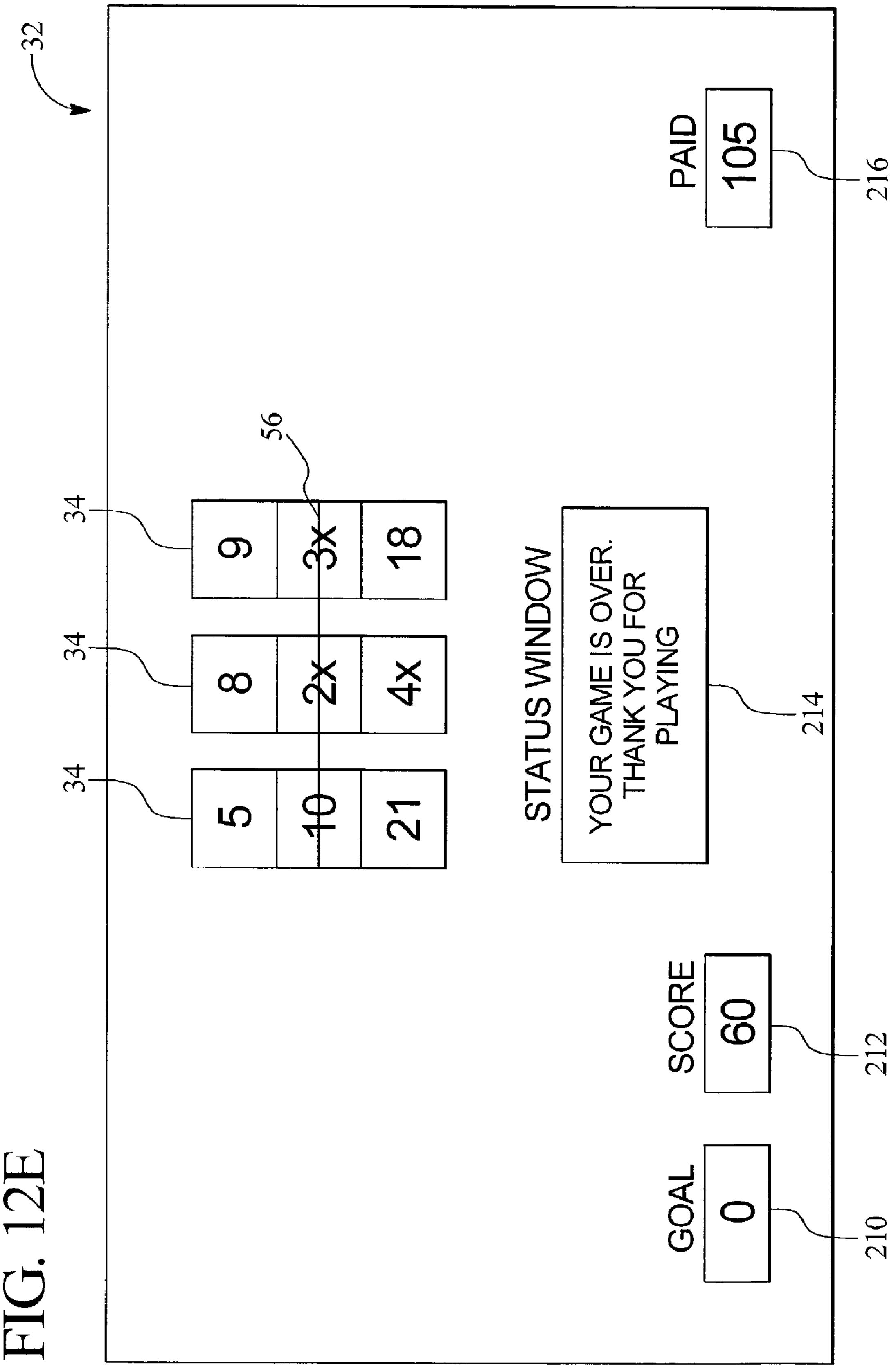

The score 212 of "60" may be very difficult to beat. Accordingly, the player has pressed the "NO" button 215 in order to collect an award equal to their score 212 of "60." Referring now to FIG. 12E, the paid window has been updated to a total award of "105" to reflect the payment of the award of "60" which was added to the previous award of "45." The player's game is now over as indicated by status window 214.

In this embodiment, the encore game or round is randomly triggered. In alternative embodiments, the encore game or round could be triggered by any suitable trigger such as the player achieving a predetermined number of goals, the player's score exceeding a predetermined threshold score, or by the occurrence of a predetermined symbol on one of the reels 34.

In this embodiment, the player's score is indicated by payline 56. It should be appreciated that in alternative embodiments, the game could employ more than one payline, thereby giving the player more than one opportunity to try to beat the score and achieve the goal.

it should also be appreciated that the offer and acceptance game having an increasing goal advancement does not require an encore round to be awarded, nor does it require an encore feature. Thus, the offer and acceptance game having an increasing goal advancement is itself one embodiment of the present invention.

Moreover, in one embodiment of the present invention, the encore feature by itself is provided in a game having increasing goal advancement. Thus, like the games described above with reference to FIGS. 11A to 11G, a first goal is set. The player in this embodiment must achieve the first goal in order to advance the goal and continue playing. A score is randomly generated for the player. The goal is advanced to the score when the score achieves the goal. Thus, the player must again achieve the goal in order to advance the goal and continue playing. If the player fails to achieve the goal, the player is paid an award equal to their previous score when they achieved their last goal. If the player fails to achieve any of the goals, the player does not receive and award.

During game play, the player may be awarded or provided an encore round or game after achieving the goal. In this embodiment, the encore round is randomly awarded, that is, the triggering event for the encore round occurs randomly during game play. When the player is awarded an encore round, the player is paid an award equal to their current score, that is, the score that achieved the current goal. Thereafter, the player has the benefit of playing a reinitiation of the entire game. Thus, the player has the benefit of continuing the game and trying to achieve goals that will ultimately increase the value of the award they will receive. In this embodiment, there is no limit to the amount of encore rounds that can be awarded to the player. Accordingly, the player could continuously play as long as they either achieve the goal or are awarded an encore round.

In this embodiment, the encore game or round is a reinitiation of the game the player was playing. It should be appreciated that in alternative embodiments, the encore game could be any suitable wagering game such as a slot game, a video poker game, or a blackjack game.

Figure 13:
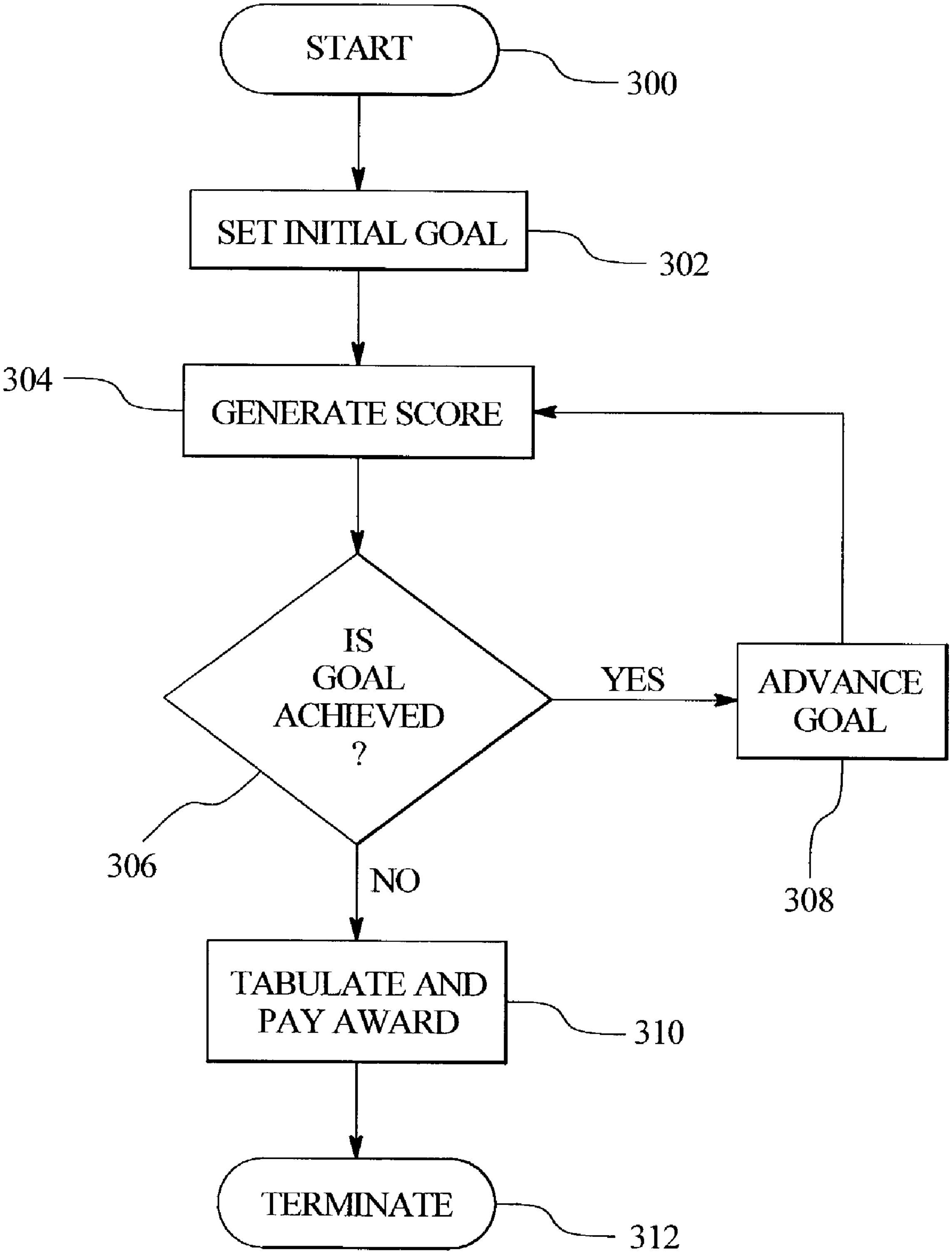
FIG. 13 is a flowchart illustrating an embodiment of a method for operating a gaming device with increasing goal advancement.

Referring now to FIG. 13, an embodiment of a method for operating a gaming device having increasing goal advancement is described. The method starts at block 300 and continues to block 302 where an initial goal is set. The initial goal can be set randomly or it can be predetermined. After the initial goal is set, a score is generated as indicated by block 304.

The score is then compared, as indicated by decision diamond 306, to the goal to see if the score achieves the goal. In one embodiment, the score achieves the goal when the score is greater than or equal to the goal. In an alternative embodiment, the score achieves the goal when the score is less than or equal to the goal. If the goal is achieved at decision diamond 306, then the goal is advanced as indicated by block 308. In one embodiment, the goal is advanced at block 308 by increasing the numerical value of the goal. In an alternative embodiment, the goal is advanced at block 308 by decreasing the numerical value of the goal.

Once the goal has been advanced, a new score is generated as indicated by block 304 and the method proceeds as described above. If the score fails to achieve goal, then an award is tabulated and paid as indicated by block 310. The awards can be tabulated in any suitable fashion including those described in the above embodiments. For instance, if the player does not achieve at least one goal, then the player may be awarded a consolation award or no award at all. Once the award has been tabulated and paid, the game and the method terminate as indicated by block 312.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a game operable upon a wager by a player;

a plurality of different and ordered goal values;

a plurality of different score values; and a processor operable to:

(a) select one of the goal values;

(b) randomly generate one of the score values;

(c) select a subsequent goal value if the score value achieves the goal value;

(d) repeat steps (b) to (c) until the score value fails to achieve the goal value; and (e) provide an award to the player based on at least one of the goal value and the score value.

2. The gaming device of claim 1, wherein the goal values are ordered in an increasing fashion.

3. The gaming device of claim 1, wherein the goal values are ordered in a decreasing fashion.

4. The gaming device of claim 1, wherein the score value achieves the goal value when the score value is equal to a value selected from the group consisting of values less than or equal to the goal value, values less than the goal value, values greater than or equal to the goal value, and values greater than the goal value.

5. The gaming device of claim 1, wherein the award is equal to the randomly generated score value.

6. The gaming device of claim 1, wherein the award is equal to a sum of each of the randomly generated score values.

7. The gaming device of claim 1, wherein the award is equal to a last selected goal value.

8. The gaming device of claim 1, wherein the award is equal to the sum of each of the selected goal values.

9. The gaming device of claim 1, wherein the score value is generated by at least one value generator.

10. The gaming device of claim 9, wherein the value generator includes at least one video wheel or video reel having a plurality of symbols thereon.

11. The gaming device of claim 10, wherein the symbols are selected from the group consisting of numbers, letters, pictures, graphics and multipliers.

12. The gaming device of claim 9, wherein the value generator includes at least one mechanical wheel or mechanical reel having a plurality of symbols thereon.

13. The gaming device of claim 12, wherein the symbols are selected from the group consisting of numbers, letters, pictures, graphics and multipliers.

14. The gaming device of claim 9, wherein the value generator is modified with the selection of each subsequent goal value.

15. A gaming device comprising:

a game operable upon a wager by a player;

a plurality of ordered award levels, each of the award levels including a goal and a plurality of score values, wherein, for each award level, at least one of said score values in said award level is different from another one of the score values in said award level; and a processor operable to:

(a) select a first award level;

(b) cause a random generation of one of the score values of the selected award level;

(c) select a subsequent award level if the randomly generated score value achieves the goal of the selected award level;

(d) repeat steps (b) to (c) until the randomly generated score value does not achieve the goal of the selected award level; and (e) provide an award to the player based on the selected award level when the randomly generated score value does not achieve the goal of the selected award level.

16. The gaming device of claim 15, wherein the goal increases by a predetermined amount with each subsequently selected award level.

17. The gaming device of claim 15, wherein the goal decreases by a predetermined amount with each subsequently selected award level.

18. The gaming device of claim 15, wherein the score value achieves the goal when the score value is equal to a value selected from the group consisting of values less than or equal to the goal, values less than the goal, values greater than or equal to the goal, and values greater than the goal.

19. The gaming device of claim 15, wherein the goal is based on the randomly generated score value.

20. The gaming device of claim 15, wherein the award is equal to the goal of the selected award level when the randomly generated score value does not achieve the goal of the selected award level.

21. The gaming device of claim 15, wherein the award is equal to a sum of the goals from each of the selected award levels.

22. The gaming device of claim 15, wherein all of the score values increase with each subsequently selected award level.

23. The gaming device of claim 15, wherein an average of the score values increases with each subsequently selected award level.

24. The gaming device of claim 15, wherein all of the score values decrease with each subsequently selected award level.

25. The gaming device of claim 15, wherein an average of the score values decreases with each subsequently selected award level.

26. A gaming device comprising:

a game operable upon a wager by a player;

a plurality of award levels, each of the award levels having an associated goal value;

at least one value generator including a plurality of symbols;

a processor operable to:

(a) select one of the award levels;

(b) cause a random generation of at least two of the symbols by the value generator to determine a score value for the selected award level;

(c) select another award level when the score value for the selected award level achieves the goal value associated with that award level;

(d) repeat (b) to (c) until the score value for the selected award level fails to achieve the goal value associated with that award level; and (e) provide an award to the player based on the award level obtained during the game when score value for the selected award level fails to achieve the goal value associated with that award level.

27. The gaming device of claim 26, wherein the game is selected from the group consisting of primary games and bonus games.

28. The gaming device of claim 26, wherein the score value achieves the goal value when the score value is equal to a value selected from the group consisting of values less than or equal to the goal value, values less than the goal value, values greater than or equal to the goal value, values greater than the goal value, and values equal to the goal value.

29. The gaming device of claim 26, wherein the goal value associated with each of the award levels increases by one of a predetermined amount and a random amount with each respective award level.

30. The gaming device of claim 26, wherein the goal value associated with each of the award levels decreases by one of a predetermined amount and a random amount with each respective award level.

31. The gaming device of claim 26, wherein the goal value associated with each of the award levels is equal to the score value that achieved the previous goal value.

32. The gaming device of claim 26, wherein the value generator includes at least one video reel or video wheel.

33. The gaming device of claim 26, wherein the value generator includes at least one mechanical reel or mechanical wheel.

34. The gaming device of claim 26, wherein the symbols are selected from the groups consisting of numbers, letters, pictures, graphics and multipliers.

35. The gaming device of claim 26, wherein the symbols are modified with each respective award level.

36. The gaming device of claim 26, wherein the symbols are numerical values and at least one of the numerical values is modified with each respective award level.

37. The gaming device of claim 36, wherein said modification is selected from the group consisting of increasing all of the numerical values, increasing an average of the numerical values, decreasing all of the numerical values, and decreasing an average of the numerical values.

38. The gaming device of claim 26, wherein the award is equal to one of the goal value associated with the award level obtained during the game and the score value that achieved the goal value associated with the award level obtained during the game.

39. The gaming device of claim 26, wherein the award is equal to a sum of the goal values associated with each of the award levels obtained during the game.

40. The gaming device of claim 26, including an encore round provided to the player, wherein the encore round includes a reinitiation of the game.

41. The gaming device of claim 26, wherein the game is controlled by a processor.

42. A method for operating a gaming device, the method comprising the steps of:

(a) selecting a goal from a plurality of different and ordered goals;

(b) randomly generating a score from a plurality of different scores;

(c) selecting a subsequent goal when the score achieves the goal;

(d) repeating steps (b) to (c) until the score fails to achieve the goal; and (e) providing an award to a player based on at least one of the score and the goal.

43. The method of claim 42, wherein the goal and the score include numerical values and the step of advancing the goal when the score achieves the goal includes increasing the numerical value of the goal when the score is greater than or equal to the goal.

44. The method of claim 42, wherein the goal and the score include numerical values and the step of advancing the goal when the score achieves the goal includes decreasing the numerical value of the goal when the score is less than or equal to the goal.

45. The method of claim 42, wherein the award is equal to a last generated score that achieves the goal.

46. The method of claim 42, wherein the award is equal to a sum of each of the randomly generated scores.

47. The method of claim 42, wherein the award is equal to a last selected goal.

48. The method of claim 42, wherein the award is equal to a sum of each of the selected goals.

49. The method of claim 42, wherein the score is generated by at least one value generator.

50. The method of claim 49, wherein the value generator includes at least one video wheel or video reel having a plurality of symbols thereon.

51. The method of claim 50, wherein the symbols are selected from the group consisting of numbers, letters, pictures, graphics and multipliers.

52. The method of claim 49, wherein the value generator includes at least one mechanical wheel or mechanical reel having a plurality of symbols thereon.

53. The method of claim 52, wherein the symbols are selected from the group consisting of numbers, letters, pictures, graphics and multipliers.

54. The gaming device of claim 49, wherein the value generator is modified with each advancement of the goal.

55. The method of claim 42, which includes operating the gaming device through a data network.

56. The method of claim 42, wherein the data network is an internet.

* * * * *